United States Patent
Manome

(10) Patent No.: US 12,508,701 B2
(45) Date of Patent: Dec. 30, 2025

(54) ROBOT

(71) Applicant: YAMAHA HATSUDOKI KABUSHIKI KAISHA, Iwata (JP)

(72) Inventor: Toshifumi Manome, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 18/698,198

(22) PCT Filed: Oct. 14, 2021

(86) PCT No.: PCT/JP2021/038048
§ 371 (c)(1),
(2) Date: Apr. 3, 2024

(87) PCT Pub. No.: WO2023/062777
PCT Pub. Date: Apr. 20, 2023

(65) Prior Publication Data
US 2024/0326238 A1 Oct. 3, 2024

(51) Int. Cl.
*B25J 9/12* (2006.01)
*B25J 9/10* (2006.01)
*B25J 17/00* (2006.01)

(52) U.S. Cl.
CPC .......... *B25J 9/102* (2013.01); *B25J 9/12* (2013.01); *B25J 17/00* (2013.01)

(58) Field of Classification Search
CPC .............................. B25J 19/0054; H02K 9/06
See application file for complete search history.

(56) References Cited

U.S. PATENT DOCUMENTS

| | | |
|---|---|---|
| 6,267,022 B1 | 7/2001 | Suzuki |
| 2008/0315729 A1* | 12/2008 | Noda ............ H02K 9/06 310/60 R |
| 2015/0327396 A1 | 11/2015 | Hahakura et al. |
| 2016/0250759 A1 | 9/2016 | Watanabe |
| 2017/0368695 A1 | 12/2017 | Kohzaki |
| 2019/0061178 A1 | 2/2019 | Chikara et al. |

FOREIGN PATENT DOCUMENTS

| | | | |
|---|---|---|---|
| CN | 112894875 A | * 6/2021 | ......... B25J 19/0054 |
| JP | H04-256595 A | 9/1992 | |
| JP | H10-337685 A | 12/1998 | |
| JP | 2004-353593 A | 12/2004 | |
| JP | 2009024868 A | * 2/2009 | |
| JP | 2015-212001 A | 11/2015 | |
| JP | 2017-226042 A | 12/2017 | |
| JP | 2019-047577 A | 3/2019 | |

(Continued)

OTHER PUBLICATIONS

Machine translation of CN-112894875-A. (Year: 2021).*

(Continued)

*Primary Examiner* — Randell J Krug
(74) *Attorney, Agent, or Firm* — Studebaker Brackett PLLC

(57) ABSTRACT

A robot includes a motor, a speed reducer, a base, a first arm, a second arm, and an impeller operable to rotate together with the first arm or the speed reducer. The impeller is operable to rotate together with the first arm or the speed reducer and generate wind to cool the motor.

12 Claims, 18 Drawing Sheets

(56) References Cited

FOREIGN PATENT DOCUMENTS

| | | |
|---|---|---|
| JP | 2019-217573 A | 12/2019 |
| JP | 2020-069577 A | 5/2020 |
| JP | 2020-203363 A | 12/2020 |
| WO | 2020/136890 A1 | 7/2020 |

OTHER PUBLICATIONS

Machine translation of JP-2009024868-A. (Year: 2009).*
International Search Report issued in PCT/JP2021/038048; mailed Jan. 11, 2022.
Written Opinion of the International Searching Authority issued in PCT/JP2021/038048; mailed Jan. 11, 2022.
An Office Action; "Notice of Reasons for Refusal," mailed by the Japanese Patent Office on Nov. 26, 2024, which corresponds to Japanese Patent Application No. 2023-553845 and is related to U.S. Appl. No. 18/698,198.
An Office Action mailed by the Korean Ministry of Intellectual Property on Oct. 13, 2025, which corresponds to Korean Patent Application No. 10-2024-7003987 and is related to U.S. Appl. No. 18/698,198; with English language translation.

* cited by examiner

FIRST EMBODIMENT

FIG.3 SECTIONAL VIEW OF PORTION K

FIG.6 SECOND EMBODIMENT

THIRD EMBODIMENT

FOURTH EMBODIMENT

FIFTH EMBODIMENT

SIXTH EMBODIMENT

FIG. 11 SEVENTH EMBODIMENT

EIGHTH EMBODIMENT

NINTH EMBODIMENT

TENTH EMBODIMENT

ELEVENTH EMBODIMENT

FIRST MODIFIED EXAMPLE

SECOND MODIFIED EXAMPLE

THIRD MODIFIED EXAMPLE

FOURTH MODIFIED EXAMPLE

ROBOT

CROSS-REFERENCE TO RELATED APPLICATION

This application is a National Stage of International Patent Application No. PCT/JP2021/038048, filed Oct. 14, 2021, the entire content of which is incorporated herein by reference.

BACKGROUND

Technical Field

The present disclosure relates to a robot, and more particularly, it relates to a robot including a motor.

Background Art

Conventionally, a robot including a motor is known. Such a robot is disclosed in Japanese Patent Laid-Open No. 2017-226042, for example.

Japanese Patent Laid-Open No. 2017-226042 discloses a robot including a motor. The robot includes a base, a movable member, a speed reducer, and a cooling fan. The base is fixed to an installation surface. The movable member rotates with respect to the base. The speed reducer slows down rotation of the motor, and the movable member is rotated. The cooling fan is an electric fan. The cooling fan circulates a generated airflow along a surface of the motor.

SUMMARY

In the robot disclosed in Japanese Patent Laid-Open No. 2017-226042, the cooling fan is an electric fan, and thus wiring is required to drive the cooling fan, for example. Therefore, in the robot disclosed in Japanese Patent Laid-Open No. 2017-226042, the number of components of the robot such as wiring increases due to the use of an electric cooling fan to cool the motor, and the structure of the robot such as wiring routing is complex. Thus, in the robot disclosed in Japanese Patent Laid-Open No. 2017-226042, it is desired to reduce or prevent an increase in the number of components required to cool the motor and to reduce or prevent the complexity of the structure of the robot.

Accordingly, the present disclosure provides a robot capable of reducing or preventing an increase in the number of components required to cool a motor and reducing or preventing the complexity of the structure of the robot.

A robot according to an aspect of the present disclosure includes a motor, a speed reducer including an input operable to rotate by a driving force of the motor, a speed reduction portion to slow down and transmit rotation from the input, and an output operable to rotate by a driving force from the speed reduction portion, a base, a first arm relatively rotatably attached to the base to rotate by an output from the output of the speed reducer, a second arm relatively rotatably attached to the first arm, and an impeller operable to rotate together with the first arm or the speed reducer. The impeller is operable to rotate together with the first arm or the speed reducer and generate wind to cool the motor.

In the robot according to this aspect of the present disclosure, as described above, the impeller is operable to rotate together with the first arm or the speed reducer and generate wind to cool the motor. Accordingly, wiring or the like is not required to drive the impeller, and thus an increase in the number of components required to cool the motor and the complexity of the structure of the robot can be reduced or prevented.

In the robot according to this aspect, the impeller is preferably attached to the first arm to rotate together with the first arm or is preferably attached to the input of the speed reducer to rotate together with the input. Accordingly, the impeller can be rotated simply by attaching the impeller to the first arm or the input of the speed reducer, and thus a structure to rotate the impeller can be easily achieved.

In the robot according to this aspect, the impeller preferably includes a centrifugal impeller operable to rotate together with the first arm or an axial flow impeller operable to rotate together with the speed reducer. Accordingly, wind can be generated by rotating the centrifugal impeller together with the first arm or wind can be generated by rotating the axial flow impeller together with the speed reducer, and thus a structure to generate wind so as to cool the motor can be easily achieved.

In this case, the centrifugal impeller preferably surrounds the motor. Accordingly, wind can be evenly applied to the motor, and thus the motor can be effectively cooled.

In the robot including the centrifugal impeller surrounding the motor, the input preferably includes a hollow transmission shaft including a through-hole that penetrates in a direction in which a rotation axis of the input extends and operable to transmit the driving force from the motor to the speed reduction portion, and the centrifugal impeller is preferably operable to cool the speed reducer by rotating together with the first arm, generating wind, and causing generated wind to flow into the through-hole of the transmission shaft. Accordingly, not only the motor but also the speed reducer can be cooled, and thus an increase in temperature at a joint portion of the robot can be effectively reduced or prevented.

In the robot including the impeller including the centrifugal impeller or the axial flow impeller, the base is preferably attached to the speed reducer, the input preferably includes a hollow transmission shaft including a through-hole that penetrates in a direction in which a rotation axis of the input extends and operable to transmit the driving force from the motor to the speed reduction portion, and the axial flow impeller is preferably arranged in the through-hole of the transmission shaft. Accordingly, the speed reducer can be cooled from the inside by the wind generated by the axial flow impeller, and thus the speed reducer can be effectively cooled. Furthermore, the axial flow impeller is arranged in the through-hole of the transmission shaft such that the size of the axial flow impeller is sized to match the size of the through-hole, and thus the impeller can be downsized as compared with a case in which a centrifugal impeller arranged outside the through-hole of the transmission shaft is used.

The robot in which the axial flow impeller is arranged in the through-hole preferably further includes wiring connected to the motor, and an insertion tube into which the wiring is inserted is preferably arranged inside the axial flow impeller. Accordingly, unlike a case in which the wiring is placed outside the speed reducer, the wiring can be contained within the speed reducer, and thus exposure of the wiring can be reduced.

The robot in which the axial flow impeller is arranged in the through-hole preferably further includes a first joint that is a portion connecting the first arm to the base, and a second joint that is a portion connecting the first arm to the second arm. The motor is preferably attached to the base or the first arm while being arranged in an internal space of the base or an internal space of the first arm attached to a second joint side of the second arm, and the axial flow impeller is preferably operable to send wind to the motor arranged in the internal space of the base or the internal space of the first arm. Accordingly, even when the motor is arranged in the base or at the second joint, the axial flow impeller can apply wind to the motor, and thus the motor can be effectively cooled.

The robot in which the axial flow impeller is arranged in the through-hole preferably further includes a shaft cover to cover a motor side of the through-hole of the transmission shaft in the direction in which the rotation axis of the input extends, and the shaft cover preferably includes a speed reducer-side filter portion to remove foreign matter from air while allowing the air to flow from an external space of the base to an internal space of the base through the through-hole using wind of the axial flow impeller. Accordingly, while entry of foreign matter into the transmission shaft is reduced or prevented, wind can be sent to the external space of the base by the axial flow impeller. Thus, entry of foreign matter into the internal space of the base or the internal space of the first arm can be reduced or prevented, and the speed reducer and the motor can be cooled.

In the robot in which the axial flow impeller is arranged in the through-hole, the base preferably includes a base-side filter portion to allow an external space of the base and an internal space of the base to communicate with each other, and remove foreign matter from air while allowing the air to flow from the external space of the base to the internal space of the base. Accordingly, while entry of foreign matter into the base is reduced or prevented, wind can be sent from the internal space of the base to the external space by the axial flow impeller. Thus, entry of foreign matter into the internal space of the base or the internal space of the first arm can be reduced or prevented, and the speed reducer and the motor can be cooled.

In the robot according to this aspect, the impeller is preferably operable to rotate about a same axis as a rotation axis of the output of the speed reducer. Accordingly, the impeller can be prevented from rotating eccentrically, and thus rotation of the impeller can be stabilized.

In the robot according to this aspect, the impeller is preferably attached to the first arm, the first arm is preferably attached to the output of the speed reducer, and the impeller and the speed reducer are preferably connected to each other via the first arm in a heat conductive manner. Accordingly, not only the motor but also the speed reducer can be cooled by the impeller, and thus an increase in temperature at a joint portion of the robot can be effectively reduced or prevented.

The robot according to this aspect preferably further includes a motor holder to hold the motor in an air passage of the impeller. Accordingly, wind can be stably applied to the motor, and thus the motor can be effectively cooled.

In this case, the motor holder preferably includes a convex cooling fin arranged in the air passage. Accordingly, the motor can be cooled by the cooling fin of the motor holder, and thus the motor can be more effectively cooled.

The robot according to this aspect preferably further includes a first joint that is a portion connecting the first arm to the base, and a second joint that is a portion connecting the first arm to the second arm. The motor is preferably arranged in an external space of the base attached to the speed reducer or an external space of the first arm attached to a second joint side of the second arm. Accordingly, the motor can be cooled not only by the wind from the impeller but also by being exposed to outside air, and thus the motor can be effectively cooled.

In this case, the robot preferably further includes a motor cover to cover the motor and including a motor-side filter portion to remove foreign matter from air while allowing the air to flow from an internal space of the base to the external space of the base. Accordingly, adhesion of foreign matter to the motor can be reduced or prevented, and wind can be applied to the motor. Thus, the motor can be effectively cooled.

In the robot including the motor cover, the motor and the motor cover are preferably in direct contact with each other or in contact with each other via a thermal conductor. Accordingly, the heat of the motor can be released by the motor cover, and thus the motor can be effectively cooled.

In the robot according to this aspect, the impeller preferably includes a plate-shaped movable blade that is tilted in a first rotation direction of the impeller when the impeller rotates in a second rotation direction of the impeller, and is tilted in the second rotation direction of the impeller when the impeller rotates in the first rotation direction of the impeller. Accordingly, regardless of the rotation direction of the impeller, the air volume of the impeller can be maintained substantially constant when the rotation speed is the same, and thus the motor can be efficiently cooled by the impeller.

In this case, the impeller preferably further includes a stopper to maintain a tilted posture of the movable blade. Accordingly, the air volume of the impeller can be more reliably maintained substantially constant, and thus the motor can be more efficiently cooled by the impeller.

According to the present disclosure, as described above, it is possible to reduce or prevent an increase in the number of components required to cool the motor and to reduce or prevent the complexity of the structure of the robot.

DETAILED DESCRIPTION

Embodiments embodying the present disclosure are hereinafter described on the basis of the drawings.

First Embodiment

The structure of a SCARA robot 100 according to a first embodiment of the present disclosure is described with reference to FIGS. 1 to 5. The SCARA robot 100 is an example of a "robot" in the claims.

Structure of SCARA Robot

Figure 1:
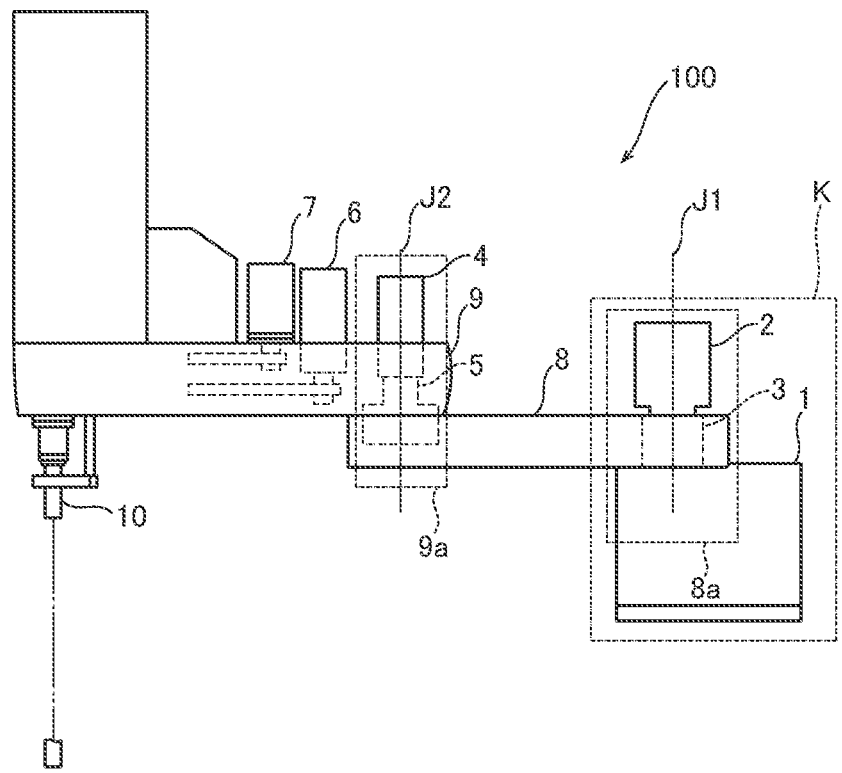
FIG. 1 is side view of a SCARA robot according to a first embodiment.
Figure 2:
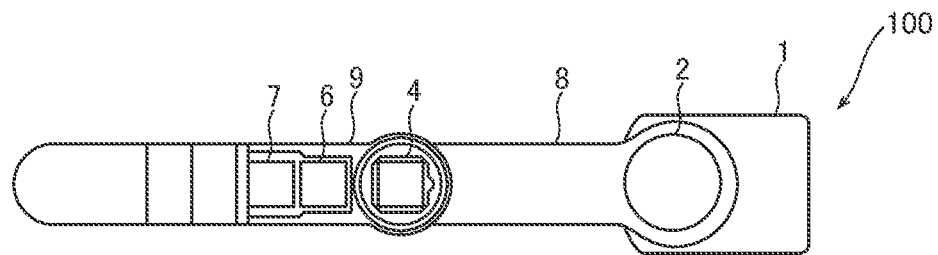
FIG. 2 is a plan view of the SCARA robot according to the first embodiment.

As shown in FIGS. 1 and 2, the SCARA robot 100 is a robot including arms that move in a horizontal direction. The SCARA robot 100 includes a base 1, a first motor 2, a first speed reducer 3, a second motor 4, a second speed reducer 5, a third motor 6, a fourth motor 7, a first arm 8, a second arm 9, and a working unit 10. The first motor 2 is an example of a "motor" in the claims. Furthermore, the first speed reducer 3 is an example of a "speed reducer" in the claims.

The base 1 is a base for fixing the SCARA robot 100 to an installation surface. The first motor 2 is a drive source that generates a driving force for driving the first arm 8. The first motor 2 is arranged in an external space S1 of the base 1 attached to the first speed reducer 3. The first speed reducer 3 slows down rotation of the first motor 2. The second motor 4 is a drive source that generates a driving force for driving the second arm 9. The second speed reducer 5 slows down rotation of the second motor 4. The third motor 6 is a drive source for driving a lifting and lowering device (not shown) that lifts and lowers the working unit 10. The fourth motor 7 is a drive source for driving a rotary drive device (not shown) that rotates the working unit 10.

The first arm 8 is relatively rotatably attached to the base 1. The first speed reducer 3 slows down rotation of the first motor 2 and transmits the slowed down rotation to the first arm 8 such that the first arm 8 rotates about a rotation axis J1 with respect to the base 1. The second arm 9 is relatively rotatably attached to the first arm 8. The second speed reducer 5 slows down rotation of the second motor 4 and transmits the slowed down rotation to the second arm 9 such that the second arm 9 rotates about a rotation axis J2 with respect to the first arm 8.

A first joint 8a is provided at a portion connecting the first arm 8 to the base 1. The first joint 8a is configured by connecting a portion of the base 1 on the first arm 8 side and a portion of the first arm 8 on the base 1 side. Furthermore, a second joint 9a that is a portion connecting the first arm 8 to the second arm 9 is provided. The second joint 9a is configured by connecting a portion of the first arm 8 on the second arm 9 side and a portion of the second arm 9 on the first arm 8 side.

Thus, in the SCARA robot 100, rotation of the first arm 8, rotation of the second arm 9, lifting and lowering by the lifting and lowering device (not shown), and rotation by the rotary drive device (not shown) are combined such that desired work is performed by the working unit 10.

Joint Structure Connecting Base to First Arm

Figure 3:
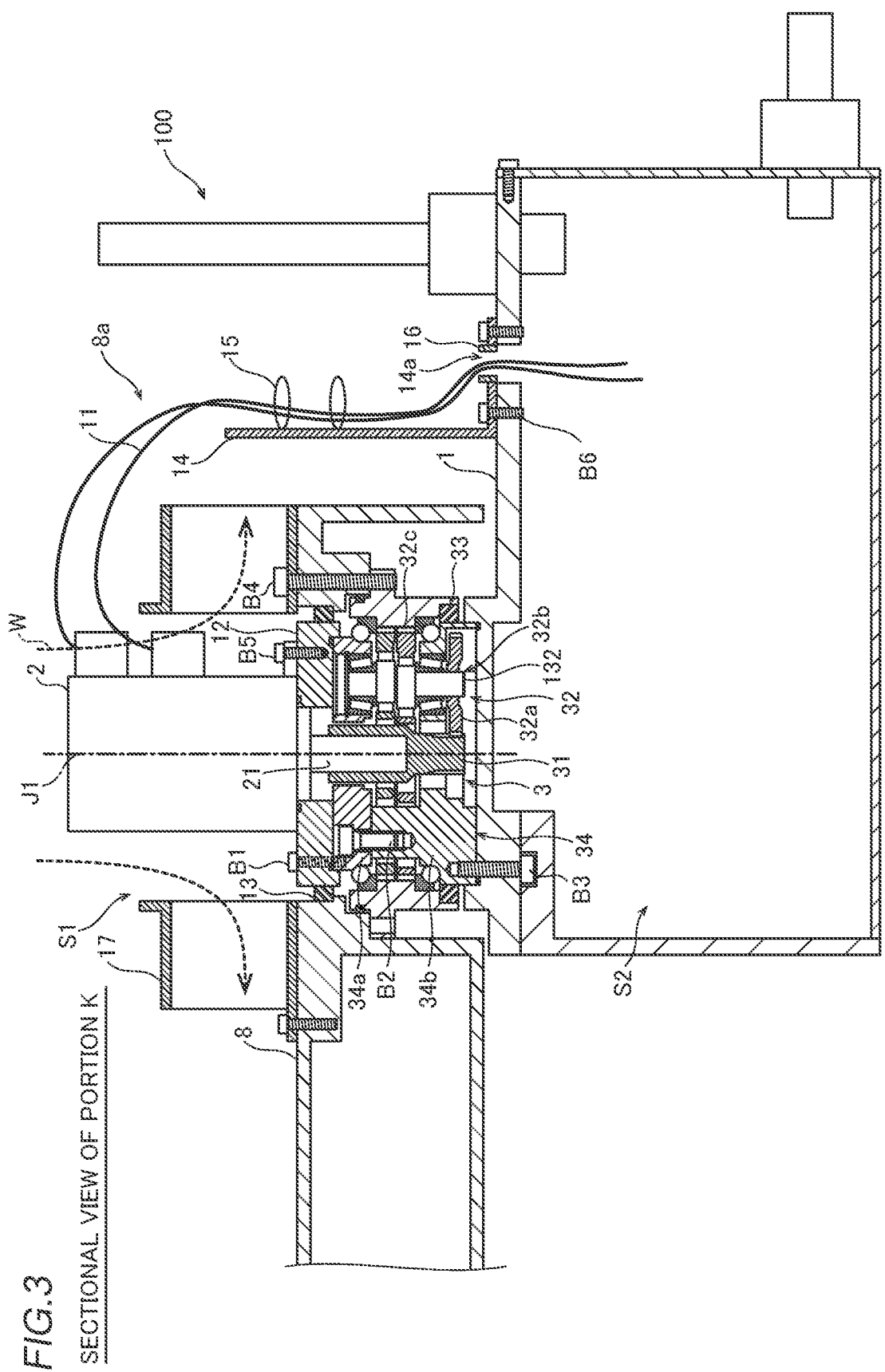
FIG. 3 is an enlarged sectional view of a portion K in FIG. 1.

In the SCARA robot 100 according to the first embodiment, as shown in FIG. 3, an impeller 17 described below is rotated as the first arm 8 rotates such that the first motor 2 is cooled. Such a joint structure (first joint 8a) connecting the base 1 to the first arm 8 is described below in detail.

Figure 4:
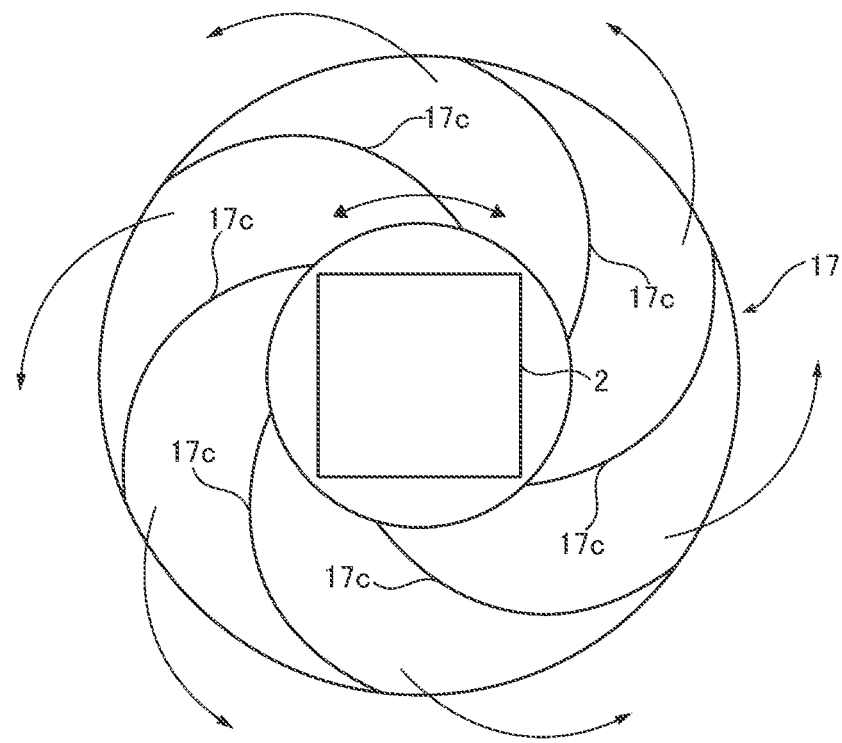
FIG. 4 is a plan view of an impeller of the SCARA robot according to the first embodiment.

As shown in FIGS. 3 and 4, the SCARA robot 100 includes the base 1, the first motor 2, the first speed reducer 3, the first arm 8, wiring 11, a motor holder 12, an oil seal 13, a stay 14, a clamp 15, a grommet 16, and the impeller 17.

The first speed reducer 3 is an eccentrically oscillating speed reducer. In particular, the first speed reducer 3 is a rotate vector (RV) speed reducer. The first speed reducer 3 includes an input 31, a speed reduction portion 32, an output 33, and a carrier 34.

A shaft 21 of the first motor 2 is connected to the input 31. Furthermore, the input 31 includes an input gear. The input 31 is rotated by the driving force of the first motor 2.

The speed reduction portion 32 slows down and transmits the rotation from the input 31. Specifically, the speed reduction portion 32 includes a spur gear 32a, an eccentric rotator 32b, and an external gear 32c.

The spur gear 32a transmits the driving force from the input 31 to the eccentric rotator 32b. The spur gear 32a meshes with the input gear. The spur gear 32a is arranged on the base 1 side of the eccentric rotator 32b in a direction in which a rotation axis J1 of the input 31 extends.

The eccentric rotator 32b includes a plurality of (two or three) crankshafts 132. The spur gear 32a slows down rotation of the input 31 and transmits the slowed down rotation to the eccentric rotator 32b. The external gear 32c includes a plurality of (two) RV gears. The external gear 32c is swingably provided on the carrier 34, swings with rotation of the crankshaft 132, slows down rotation of the crankshaft 132, and transmits the slowed down rotation to the output 33. The output 33 is a case. The output 33 rotates by the driving force from the speed reduction portion 32. That is, the output 33 rotates about the rotation axis J1 with swinging of the external gear 32c. Thus, the first arm 8 is rotated by an output from the output 33 of the first speed reducer 3.

As shown in FIG. 3, the carrier 34 is arranged inside the output 33. The carrier 34 is attached to the base 1 so as not to rotate as the first arm 8 rotates. Furthermore, the first motor 2 is attached to the carrier 34.

Specifically, the carrier 34 includes a first carrier 34a and a second carrier 34b. The first carrier 34a is provided on the opposite side to the base 1 side in a direction in which a rotation axis J1 with respect to the eccentric rotator 32b extends. One first motor 2 is attached to the first carrier 34a. The first motor 2 is fixed to the first carrier 34a by being fastened via the motor holder 12 by a fastening member B1. The second carrier 34b is connected to the first carrier 34a by a fastening member B2 and a pin (not shown), for example. The second carrier 34b is provided on the base 1 side in the direction in which the rotation axis J1 with respect to the eccentric rotator 32b extends. The second carrier 34b is attached to the base 1. That is, the second carrier 34b is fixed to the base 1 by a fastening member B3.

Thus, the first motor 2 does not rotate as the first arm 8 rotates.

The output 33 is connected to the first arm 8 such that the first arm 8 rotates together with the output 33. The first arm 8 is attached to the output 33 by a fastening member B4. Thus, the first arm 8 is attached to the base 1 via the first speed reducer 3. The wiring 11 is motor wiring connected to the first motor 2.

The motor holder 12 is a frame made of metal such as aluminum. The motor holder 12 is arranged on the side of the first carrier 34a opposite to the base 1. The motor holder 12 is attached to the carrier 34 while holding the first motor 2. That is, the motor holder 12 is fastened to the first carrier 34a by the fastening member B1 while holding the first motor 2. The first motor 2 is fastened to the motor holder 12 by a fastening member B5. The first motor 2 is fixed to the carrier 34 via the motor holder 12 while being arranged in the external space S1 of the base 1. The first motor 2 is arranged on the side of the motor holder 12 opposite to the base 1. Thus, the motor holder 12 holds the first motor 2 in an air passage W of the impeller 17.

The oil seal 13 is arranged between the motor holder 12 and the first arm 8. The oil seal 13 is arranged between the motor holder 12 and the first arm 8 on the opposite side to the base 1 side. The stay 14 is fixed to the base 1 by a fastening member B6. The stay 14 is provided to support the wiring 11. A through-hole 14a is formed in the stay 14 to allow an internal space S2 of the base 1 to communicate with the external space S1 of the base 1. The clamp 15 is a member for attaching the wiring 11 to the stay 14. The grommet 16 is attached to the stay 14 in order to pass the wiring 11 through the stay 14.

Impeller

The impeller 17 is a centrifugal impeller. A centrifugal impeller is an impeller that generates wind by sucking air from one side in the direction in which the rotation axis J1 extends and sending air radially outward, both when the impeller 17 rotates clockwise and when the impeller 17 rotates counterclockwise.

The impeller 17 rotates together with the first arm 8. The impeller 17 is attached to the first arm 8 and rotates together with the first arm 8. The impeller 17 rotates about the same axis as a rotation axis J1 of the output 33 of the first speed reducer 3.

The impeller 17 rotates together with the first arm 8 and generates wind to cool the first motor 2. That is, the impeller 17 cools the first motor 2 by using relative movement of the first arm 8 with respect to the first motor 2. Furthermore, the impeller 17 and the first speed reducer 3 are connected to each other via the first arm 8 in a heat conductive manner. Thus, heat transferred from the first speed reducer 3 is released from the impeller 17. Consequently, the first speed reducer 3 is cooled.

Figure 5:
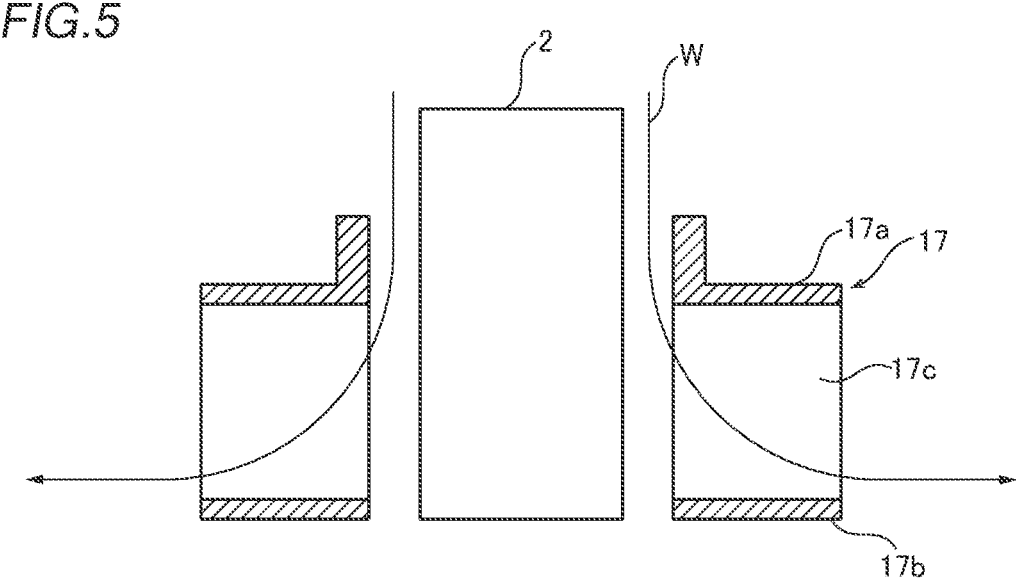
FIG. 5 is a sectional view of the impeller of the SCARA robot according to the first embodiment.

As shown in FIGS. 4 and 5, the impeller 17 sends out wind by causing the wind to follow the same air passage W both when the first arm 8 rotates clockwise and when the first arm 8 rotates counterclockwise. The air passage W is a path from one side in the direction in which the rotation axis J1 extends toward the impeller 17 and in a direction perpendicular to the rotation axis J1.

The impeller 17 surrounds the first motor 2. Thus, the first motor 2 is arranged in the air passage W, and thus the wind hits the first motor 2 to cool the first motor 2.

The impeller 17 is formed into an annular shape with a space in the center in the radial direction. The impeller 17 includes a first mount 17a, a second mount 17b, and a plurality of (six) blades 17c. The first mount 17a is attached to a portion of each of the plurality of blades 17c on the side opposite to the base 1. The second mount 17b is attached to a portion of each of the plurality of blades 17c on the base 1 side. Each of the plurality of blades 17c is an arcuate thin plate.

Advantageous Effects of First Embodiment

According to the first embodiment, the following advantageous effects are achieved.

According to the first embodiment, as described above, the impeller 17 is operable to rotate together with the first arm 8 and generate wind to cool the first motor 2. Accordingly, the wiring 11 or the like is not required to drive the impeller 17, and thus an increase in the number of components required to cool the first motor 2 and the complexity of the structure of the SCARA robot 100 can be reduced or prevented.

According to the first embodiment, as described above, the impeller 17 is attached to the first arm 8 to rotate together with the first arm 8. Accordingly, the impeller 17 can be rotated simply by attaching the impeller 17 to the first arm 8, and thus a structure to rotate the impeller 17 can be easily achieved.

According to the first embodiment, as described above, the impeller 17 includes the centrifugal impeller operable to rotate together with the first arm 8. Accordingly, wind can be generated by rotating the centrifugal impeller together with the first arm 8, and thus a structure to generate wind so as to cool the first motor 2 can be easily achieved.

According to the first embodiment, as described above, the centrifugal impeller surrounds the first motor 2. Accordingly, wind can be evenly applied to the first motor 2, and thus the first motor 2 can be effectively cooled.

According to the first embodiment, as described above, the impeller 17 is operable to rotate about the same axis as the rotation axis J1 of the output 33 of the first speed reducer 3. Accordingly, the impeller 17 can be prevented from rotating eccentrically, and thus rotation of the impeller 17 can be stabilized.

According to the first embodiment, as described above, the impeller 17 is attached to the first arm 8. The first arm 8 is attached to the output 33 of the first speed reducer 3. The impeller 17 and the first speed reducer 3 are connected to each other via the first arm 8 in a heat conductive manner. Accordingly, not only the first motor 2 but also the first speed reducer 3 can be cooled by the impeller 17, and thus an increase in temperature at a joint portion of the SCARA robot 100 can be effectively reduced or prevented.

According to the first embodiment, as described above, the SCARA robot 100 includes the motor holder 12 to hold the first motor 2 in the air passage W of the impeller 17. Accordingly, wind can be stably applied to the first motor 2, and thus the first motor 2 can be effectively cooled.

According to the first embodiment, as described above, the SCARA robot 100 includes the first joint 8a that is a portion connecting the first arm 8 to the base 1, and the second joint 9a that is a portion connecting the first arm 8 to the second arm 9. The first motor 2 is arranged in the external space S1 of the base 1 attached to the first speed reducer 3. Accordingly, the first motor 2 can be cooled not only by the wind from the impeller 17 but also by being exposed to outside air, and thus the first motor 2 can be more effectively cooled.

Second Embodiment

The structure of a SCARA robot 200 according to according to a second embodiment is described with reference to FIG. 6. In the second embodiment, a first speed reducer 203 includes a hollow transmission shaft 231a, unlike the first embodiment. In the second embodiment, detailed description of the same or similar structures as those of the first embodiment is omitted.

The structure of the SCARA robot 200 according to the second embodiment of the present disclosure is described with reference to FIG. 6. The SCARA robot 200 is an example of a "robot" in the claims.

Structure of SCARA Robot

Figure 6:
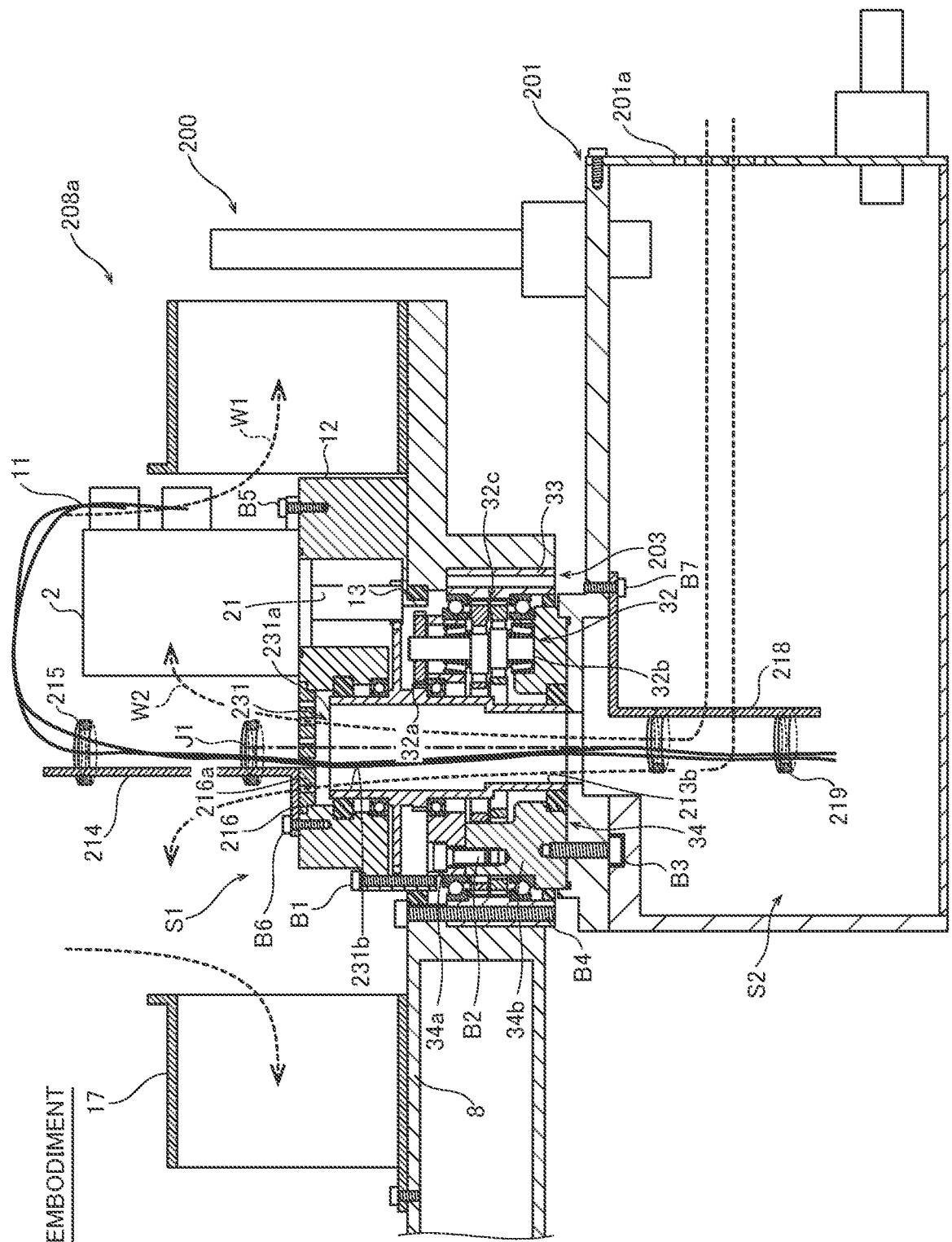
FIG. 6 is an enlarged sectional view of a joint portion connecting a base to a first arm of a SCARA robot according to a second embodiment.

As shown in FIG. 6, the SCARA robot 200 is a robot including arms that move in a horizontal direction. The SCARA robot 200 includes a base 201, a first motor 2, the first speed reducer 203, a second motor 4 (see FIG. 1), a second speed reducer 5 (see FIG. 1), a third motor 6 (see FIG. 1), a fourth motor 7 (see FIG. 1), a first arm 8, a second arm 9 (see FIG. 1), and a working unit 10 (see FIG. 1). The first motor 2 is an example of a "motor" in the claims. Furthermore, the first speed reducer 203 is an example of a "speed reducer" in the claims.

The base 201 includes a base-side filter portion 201a. The base-side filter portion 201a is a slit. The base-side filter portion 201a allows an external space S1 of the base 201 and an internal space S2 of the base 201 to communicate with each other. The base-side filter portion 201a removes foreign matter from air while allowing the air to flow from the external space S1 of the base 201 to the internal space S2 of the base 201. The base-side filter portion 201a may be a filter.

A first joint 208a is provided at a portion connecting the first arm 8 to the base 201. Furthermore, a second joint 9a (see FIG. 1) that is a portion connecting the first arm 8 to the second arm 9 is provided.

Joint Structure Connecting Base to First Arm

In the SCARA robot 200 according to the second embodiment, as shown in FIG. 6, an impeller 17 described below is rotated as the first arm 8 rotates such that the first motor 2 is cooled. Such a joint structure (first joint 208a) connecting the base 201 to the first arm 8 is described below in detail.

As shown in FIG. 6, the SCARA robot 200 includes the base 201, the first motor 2, the first speed reducer 203, the first arm 8, wiring 11, a motor holder 12, an oil seal 13, a first stay 214, a first clamp 215, a shaft cover 216, the impeller 17, a second stay 218, and a second clamp 219.

The first speed reducer 203 is an eccentrically oscillating speed reducer. In particular, the first speed reducer 203 is an RV speed reducer. The first speed reducer 203 includes an input 231, a speed reduction portion 32, an output 33, and a carrier 34.

The input 231 is rotated by a driving force of the first motor 2. The input 231 includes the hollow transmission shaft 231a. The transmission shaft 231a includes a through-hole 231b that penetrates in a direction in which a rotation axis J1 of the input 231 extends. The transmission shaft 231a transmits the driving force from the first motor 2 to the speed reduction portion 32.

The first stay 214 is fixed to the base 201 by a fastening member B6. The first stay 214 is provided to support the wiring 11. The first clamp 215 is a member for attaching the wiring 11 to the first stay 214.

Impeller

The impeller 17 is a centrifugal impeller. The impeller 17 cools the first speed reducer 203 by rotating together with the first arm 8, generating wind, and causing the generated wind to flow into the through-hole 231b of the transmission shaft 231a. An air passage W1 is a path from the base 1 side in the direction in which the rotation axis J1 extends toward the impeller 17 and in a direction perpendicular to the rotation axis J1. Furthermore, an air passage W2 is a path from the opposite side to the base 1 side in the direction in which the rotation axis J1 extends through the through-hole 231b of the transmission shaft 231a toward the impeller 17 and in the direction perpendicular to the rotation axis J1.

Other Structures

The shaft cover 216 covers the first motor 2 side of the through-hole 231b of the transmission shaft 231a in the direction in which the rotation axis J1 of the input 231 extends. The shaft cover 216 includes a speed reducer-side filter portion 216a that removes foreign matter from air while allowing the air to flow from the internal space S2 of the base 201 to the external space S1 of the base 201 through the through-hole 231b using the wind of the impeller 17. The speed reducer-side filter portion 216a is a slit. The speed reducer-side filter portion 216a may have a structure in which a grommet is attached to a filter.

The second stay 218 is fixed to the base 201 by a fastening member B7. The second stay 218 is provided to support the wiring 11. The second clamp 219 is a member for attaching the wiring 11 to the second stay 218. The remaining structures of the second embodiment are similar to those of the first embodiment.

Advantageous Effects of Second Embodiment

According to the second embodiment, similarly to the first embodiment, the impeller 17 is operable to rotate together with the first arm 8 and generate wind to cool the first motor 2. Accordingly, an increase in the number of components required to cool the first motor 2 and the complexity of the structure of the SCARA robot 200 can be reduced or prevented.

According to the second embodiment, as described above, the input 31 includes the hollow transmission shaft 231a including the through-hole 231b that penetrates in the direction in which the rotation axis J1 of the input 231 extends and operable to transmit the driving force from the first motor 2 to the speed reduction portion 32. The centrifugal impeller is operable to cool the first speed reducer 3 by rotating together with the first arm 8, generating wind, and causing the generated wind to flow into the through-hole 231b of the transmission shaft 231a. Accordingly, not only the first motor 2 but also the first speed reducer 3 can be cooled, and thus an increase in temperature at a joint portion of the SCARA robot 200 can be effectively reduced or prevented. The remaining advantageous effects of the second embodiment are similar to the advantageous effects of the first embodiment.

Third Embodiment

The structure of a SCARA robot 300 according to a third embodiment is described with reference to FIG. 7. In the third embodiment, an impeller 316 is an axial flow impeller, unlike the first embodiment. In the third embodiment, detailed description of the same or similar structures as those of the first embodiment is omitted.

The structure of the SCARA robot 300 according to the third embodiment of the present disclosure is described with reference to FIG. 7. The SCARA robot 300 is an example of a "robot" in the claims.

Structure of SCARA Robot

Figure 7:
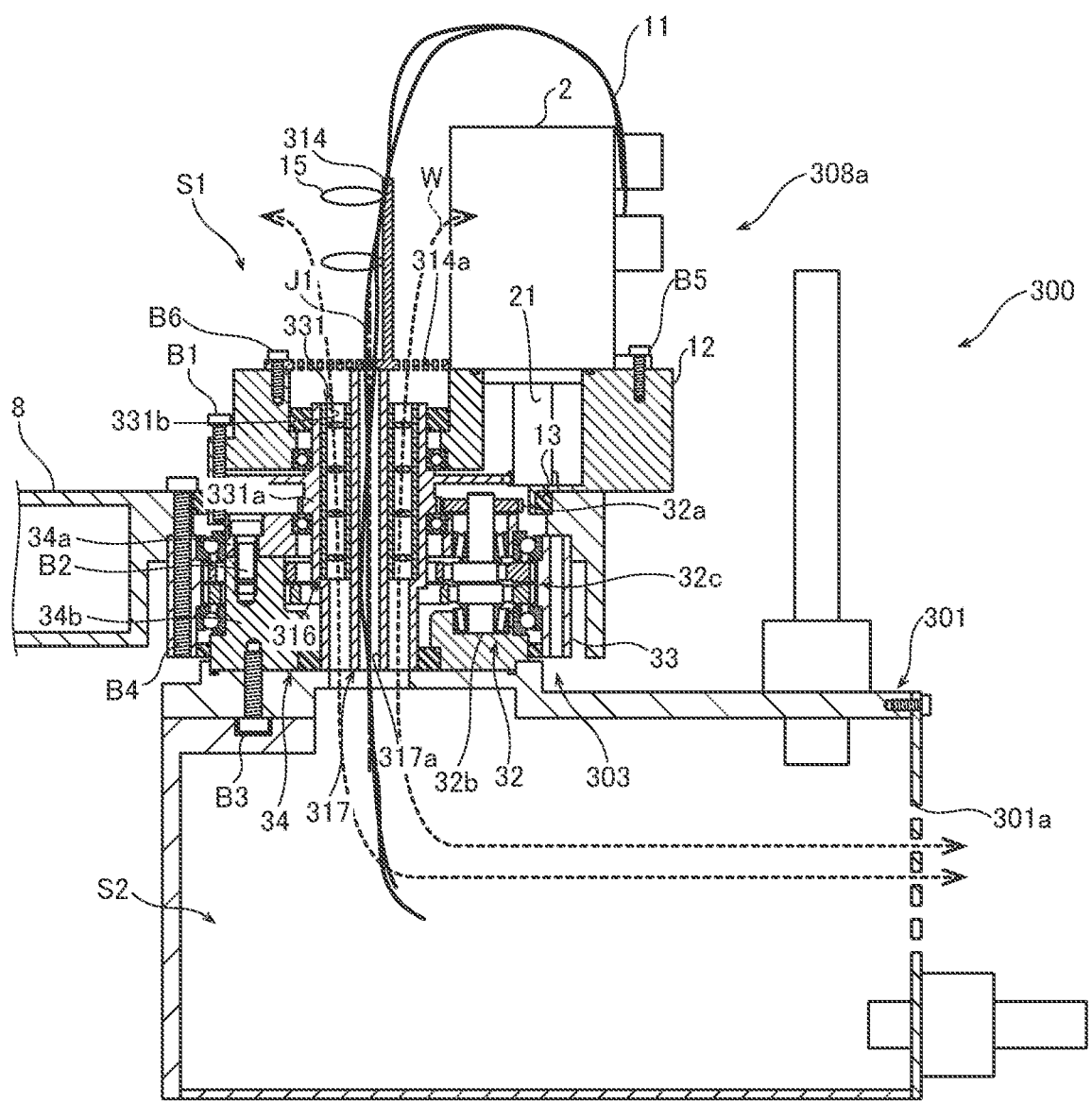
FIG. 7 is an enlarged sectional view of a joint portion connecting a base to a first arm of a SCARA robot according to a third embodiment.

As shown in FIG. 7, the SCARA robot 300 is a robot including arms that move in a horizontal direction. The SCARA robot 300 includes a base 301, a first motor 2, a first speed reducer 303, a second motor 4 (see FIG. 1), a second speed reducer 5 (see FIG. 1), a third motor 6 (see FIG. 1), a fourth motor 7 (see FIG. 1), a first arm 8, a second arm 9 (see FIG. 1), and a working unit 10 (see FIG. 1). The first motor 2 is an example of a "motor" in the claims. Furthermore, the first speed reducer 303 is an example of a "speed reducer" in the claims.

The base 301 includes a base-side filter portion 301a. The base-side filter portion 301a is a slit. The base-side filter portion 301a allows an external space S1 of the base 301 and an internal space S2 of the base 301 to communicate with each other. The base-side filter portion 301a removes foreign matter from air while allowing the air to flow from the external space S1 of the base 301 to the internal space S2 of the base 301. The base-side filter portion 301a may be a filter.

A first joint 308a is provided at a portion connecting the first arm 8 to the base 301. Furthermore, a second joint 9a (see FIG. 1) that is a portion connecting the first arm 8 to the second arm 9 is provided.

Joint Structure Connecting Base to First Arm

In the SCARA robot 300 according to the third embodiment, as shown in FIG. 7, the impeller 316 described below is rotated as the first speed reducer 303 rotates such that the first motor 2 and the first speed reducer 303 are cooled. Such a joint structure (first joint 308a) connecting the base 301 to the first arm 8 is described below in detail.

As shown in FIG. 7, the SCARA robot 300 includes the base 301, the first motor 2, the first speed reducer 303, the first arm 8, wiring 11, a motor holder 12, an oil seal 13, a stay 314, a clamp 15, the impeller 316, and an insertion tube 317.

The first speed reducer 303 is an eccentrically oscillating speed reducer. In particular, the first speed reducer 303 is an RV speed reducer. The first speed reducer 303 includes an input 331, a speed reduction portion 32, an output 33, and a carrier 34.

The input 331 is rotated by a driving force of the first motor 2. The input 331 includes a hollow transmission shaft 331a. The transmission shaft 331a includes a through-hole 331b that penetrates in a direction in which a rotation axis J1 of the input 331 extends. The transmission shaft 331a transmits the driving force from the first motor 2 to the speed reduction portion 32.

The stay 314 is fixed to the motor holder 12 by a fastening member B6. The stay 314 is provided to support the wiring 11. The stay 314 includes a speed reducer-side filter portion 314a that removes foreign matter from air while allowing the air to flow from the external space S1 of the base 301 to the internal space S2 of the base 301 through the through-hole 331b using wind of the impeller 316. The speed reducer-side filter portion 314a is a slit. The speed reducer-side filter portion 314a may be a filter.

Impeller

The impeller 316 is an axial flow impeller. The axial flow impeller refers to an impeller that generates wind by sucking air from one side in the direction in which the rotation axis J1 extends and sending out the air toward the other side in the direction in which the rotation axis J1 extends when the impeller rotates clockwise or counterclockwise.

The impeller 316 rotates together with the first speed reducer 303. The impeller 316 is attached to the input 331 of the first speed reducer 303 and rotates together with the first speed reducer 303. The impeller 316 rotates about the same axis as a rotation axis J1 of the output 33 of the first speed reducer 303.

The impeller 316 rotates together with the first speed reducer 303 and generates wind to cool the first motor 2 and the first speed reducer 303. That is, the impeller 316 cools the first motor 2 by using relative movement of the first speed reducer 303 with respect to the first motor 2. Furthermore, the impeller 316 and the first speed reducer 303 are directly connected to each other in a heat conductive manner. Thus, heat transferred from the first speed reducer 303 is released from the impeller 316.

As shown in FIG. 7, the impeller 316 sends out wind by causing the wind to follow an air passage W when rotating clockwise or counterclockwise. The air passage W has a path from the base 301 side to the first motor 2 side in the direction in which the rotation axis J1 extends, and a path from the first motor 2 side to the base 301 side in the direction in which the rotation axis J1 extends. That is, the air passage W has two paths because the direction of the wind changes depending on whether the impeller 316 rotates clockwise or counterclockwise.

The impeller 316 is arranged in the through-hole 331b of the transmission shaft 331a. Thus, the wind passes through the first speed reducer 303, and thus the first speed reducer 303 is cooled. Furthermore, the wind emitted from the impeller 316 or drawn into the impeller 316 hits the first motor 2 to cool the first motor 2.

Insertion Tube

The wiring 11 is inserted into the insertion tube 317. The insertion tube 317 includes a through-hole 317a into which the wiring 11 is inserted. The insertion tube 317 is arranged inside the impeller 316. The remaining structures of the third embodiment are similar to those of the first embodiment.

Advantageous Effects of Third Embodiment

According to the third embodiment, similarly to the first embodiment, the impeller 316 is operable to rotate together with the first speed reducer 303 and generate wind to cool the first motor 2. Accordingly, an increase in the number of components required to cool the first motor 2 and the complexity of the structure of the SCARA robot 300 can be reduced or prevented.

According to the third embodiment, as described above, the impeller 316 is attached to the input 331 of the first speed reducer 303 to rotate together with the input 331. Accordingly, the impeller 316 can be rotated simply by attaching it to the input 331 of the first speed reducer 303, and thus a structure to rotate the impeller 316 can be easily achieved.

According to the third embodiment, as described above, the base 301 is attached to the first speed reducer 303. The input 331 includes the hollow transmission shaft 331a including the through-hole 331b that penetrates in the direction in which the rotation axis J1 of the input 331 extends and operable to transmit the driving force from the first motor 2 to the speed reduction portion 32. The axial flow impeller is arranged in the through-hole 331b of the transmission shaft 331a. Accordingly, the first speed reducer 303 can be cooled from the inside by the wind generated by the axial flow impeller, and thus the first speed reducer 303 can be effectively cooled. Furthermore, the axial flow impeller is arranged in the through-hole 331b of the transmission shaft 331a such that the size of the axial flow impeller is sized to match the size of the through-hole 331b, and thus the impeller 316 can be downsized as compared with a case in which a centrifugal impeller arranged outside the through-hole 331b of the transmission shaft 331a is used.

According to the third embodiment, as described above, the SCARA robot 300 includes the wiring 11 connected to the first motor 2. The insertion tube 317 into which the wiring 11 is inserted is arranged inside the axial flow impeller. Accordingly, unlike a case in which the wiring 11 is placed outside the first speed reducer 303, the wiring 11 can be contained within the first speed reducer 303, and thus exposure of the wiring 11 can be reduced.

According to the third embodiment, as described above, the base 301 includes the base-side filter portion 301a to allow the external space S1 of the base 301 and the internal space S2 of the base 301 to communicate with each other, and remove foreign matter from air while allowing the air to flow from the external space S1 of the base 301 to the internal space S2 of the base 301. Accordingly, while entry of foreign matter into the base 301 is reduced or prevented, wind can be sent from the internal space S2 of the base 301 to the external space S1 by the axial flow impeller. Thus, entry of foreign matter into the internal space S2 of the base 301 can be reduced or prevented, and the first speed reducer 303 and the first motor 2 can be cooled.

According to the third embodiment, as described above, the stay 314 includes the speed reducer-side filter portion 314a to remove foreign matter from air while allowing the air to flow from the external space S1 of the base 301 to the internal space S2 of the base 301 through the through-hole 331b using the wind of the impeller 316. Accordingly, while entry of foreign matter into the base 301 is reduced or prevented, wind can be sent from the external space S1 of the base 301 to the internal space S2 by the axial flow impeller. Thus, entry of foreign matter into the internal space S2 of the base 301 can be reduced or prevented, and the first speed reducer 303 and the first motor 2 can be cooled. The remaining advantageous effects of the third embodiment are similar to the advantageous effects of the first embodiment.

Fourth Embodiment

The structure of a SCARA robot 400 according to a fourth embodiment is described with reference to FIG. 8. In the fourth embodiment, the SCARA robot 400 does not include an insertion tube, unlike the third embodiment. In the fourth embodiment, detailed description of the same or similar structures as those of the third embodiment is omitted.

The structure of the SCARA robot 400 according to the fourth embodiment of the present disclosure is described with reference to FIG. 8. The SCARA robot 400 is an example of a "robot" in the claims.

Structure of SCARA Robot

Figure 8:
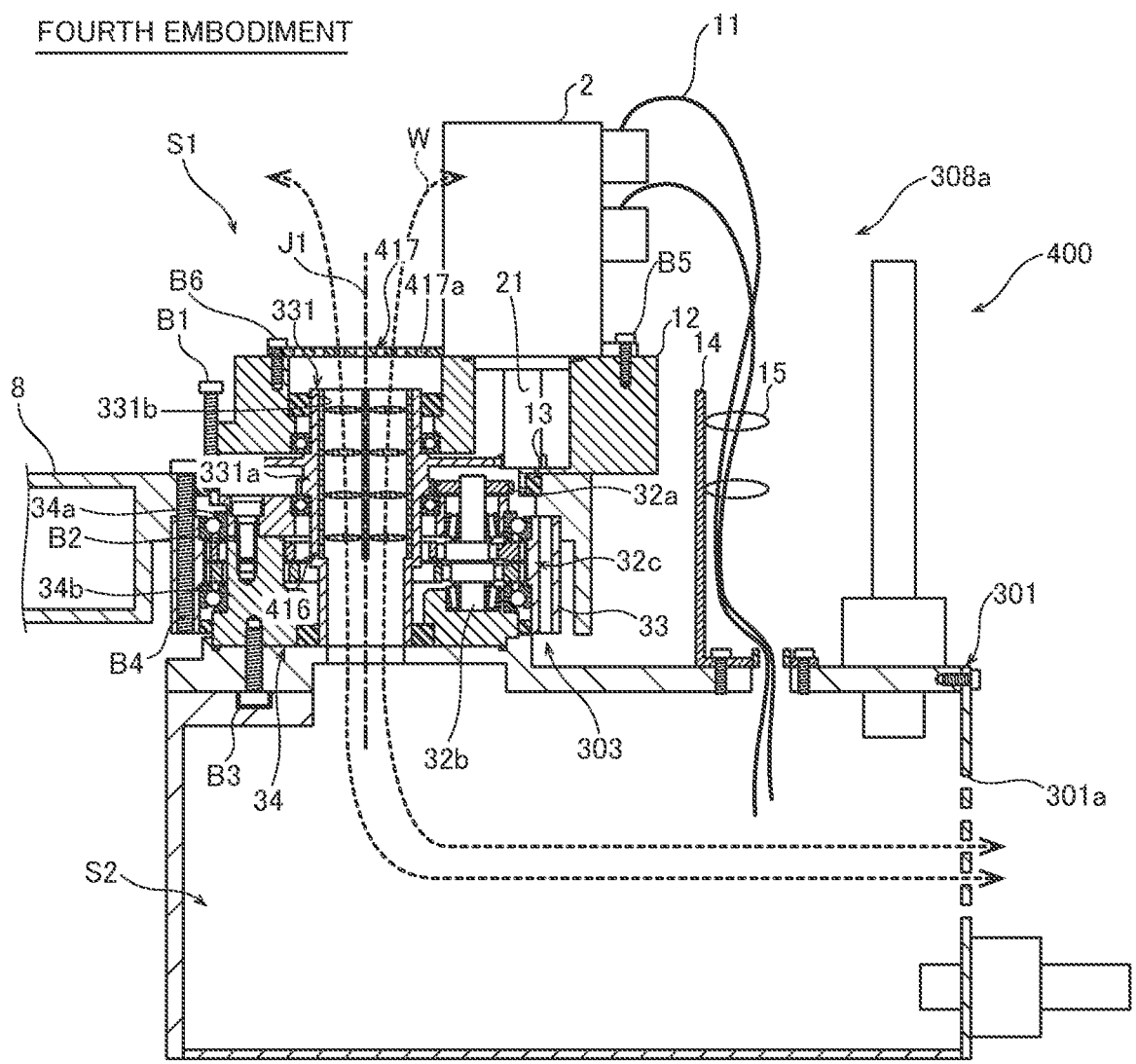
FIG. 8 is an enlarged sectional view of a joint portion connecting a base to a first arm of a SCARA robot according to a fourth embodiment.

As shown in FIG. 8, the SCARA robot 400 is a robot including arms that move in a horizontal direction. The SCARA robot 400 includes a base 301, a first motor 2, a first speed reducer 303, a second motor 4 (see FIG. 1), a second speed reducer 5 (see FIG. 1), a third motor 6 (see FIG. 1), a fourth motor 7 (see FIG. 1), a first arm 8, a second arm 9 (see FIG. 1), and a working unit 10 (see FIG. 1). The first motor 2 is an example of a "motor" in the claims. Furthermore, the first speed reducer 303 is an example of a "speed reducer" in the claims.

A first joint 308a is provided at a portion connecting the first arm 8 to the base 301. Furthermore, a second joint 9a (see FIG. 1) that is a portion connecting the first arm 8 to the second arm 9 is provided.

Joint Structure Connecting Base to First Arm

In the SCARA robot 400 according to the fourth embodiment, as shown in FIG. 8, an impeller 416 described below is rotated as the first speed reducer 303 rotates such that the first motor 2 is cooled. Such a joint structure (first joint 308a) connecting the base 301 to the first arm 8 is described below in detail.

As shown in FIG. 8, the SCARA robot 400 includes the base 301, the first motor 2, the first speed reducer 303, the first arm 8, wiring 11, a motor holder 12, an oil seal 13, a stay 14, a clamp 15, the impeller 416, and a shaft cover 417.

Impeller

The impeller 416 is an axial flow impeller. The impeller 416 rotates together with the first speed reducer 303. The impeller 416 is attached to an input 331 of the first speed reducer 303 and rotates together with the first speed reducer 303. The impeller 416 rotates about the same axis as a rotation axis J1 of an output 33 of the first speed reducer 303.

Shaft Cover

The shaft cover 417 covers the first motor 2 side of a through-hole 331b of a transmission shaft 331a in a direction in which a rotation axis J1 of the input 331 extends. The shaft cover 417 includes a speed reducer-side filter portion 417a. The speed reducer-side filter portion 417a removes foreign matter from air while allowing the air to flow from an external space S1 of the base 301 to an internal space S2 of the base 301 through the through-hole 331b using wind of the impeller 416. The speed reducer-side filter portion 417a is a slit. The speed reducer-side filter portion 417a may be a filter. The remaining structures of the fourth embodiment are similar to those of the first embodiment.

Advantageous Effects of Fourth Embodiment

According to the fourth embodiment, similarly to the third embodiment, the impeller 416 is operable to rotate together with the first speed reducer 303 and generate wind to cool the first motor 2. Accordingly, an increase in the number of components required to cool the first motor 2 and the complexity of the structure of the SCARA robot 400 can be reduced or prevented.

According to the fourth embodiment, as described above, the SCARA robot 400 includes the shaft cover 417 to cover the first motor 2 side of the through-hole 331b of the transmission shaft 331a in the direction in which the rotation axis J1 of the input 331 extends. The shaft cover 417 includes the speed reducer-side filter portion 417a to remove foreign matter from air while allowing the air to flow from the external space S1 of the base 301 to the internal space S2 of the base 301 through the through-hole 331b using the wind of the axial flow impeller. Accordingly, while entry of foreign matter into the transmission shaft 331a is reduced or prevented, wind can be sent to the external space S1 of the base 301 by the axial flow impeller. Thus, entry of foreign matter into the internal space S2 of the base 301 can be reduced or prevented, and the first speed reducer 303 and the first motor 2 can be cooled. The remaining advantageous effects of the fourth embodiment are similar to the advantageous effects of the third embodiment.

Fifth Embodiment

The structure of a SCARA robot 500 according to a fifth embodiment is described with reference to FIG. 9. In the fifth embodiment, the SCARA robot 500 includes a motor cover 517, unlike the fourth embodiment. In the fifth embodiment, detailed description of the same or similar structures as those of the fourth embodiment is omitted.

The structure of the SCARA robot 500 according to the fifth embodiment of the present disclosure is described with reference to FIG. 9. The SCARA robot 500 is an example of a "robot" in the claims.

Structure of SCARA Robot

Figure 9:
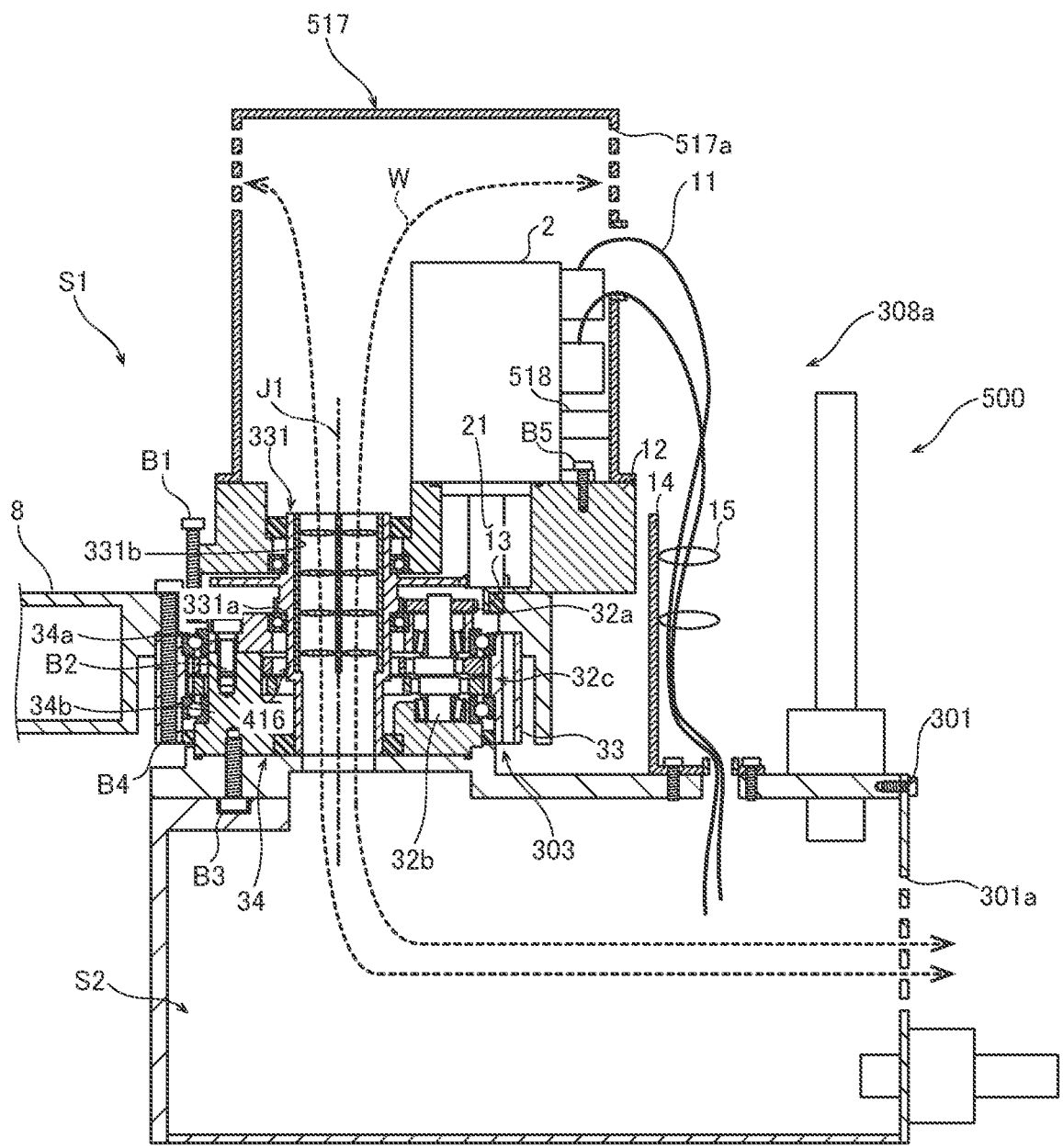
FIG. 9 is an enlarged sectional view of a joint portion connecting a base to a first arm of a SCARA robot according to a fifth embodiment.

As shown in FIG. 9, the SCARA robot 500 is a robot including arms that move in a horizontal direction. The SCARA robot 500 includes a base 301, a first motor 2, a first speed reducer 303, a second motor 4, a second speed reducer 5, a third motor 6, a fourth motor 7, a first arm 8, a second arm 9, and a working unit 10. The first motor 2 is an example of a "motor" in the claims. Furthermore, the first speed reducer 303 is an example of a "speed reducer" in the claims.

A first joint 308a is provided at a portion connecting the first arm 8 to the base 301. Furthermore, a second joint 9a (see FIG. 1) that is a portion connecting the first arm 8 to the second arm 9 is provided.

Joint Structure Connecting Base to First Arm

In the SCARA robot 500 according to the fifth embodiment, as shown in FIG. 9, an impeller 416 described below is rotated as the first speed reducer 303 rotates such that the first motor 2 is cooled. Such a joint structure (first joint 308a) connecting the base 301 to the first arm 8 is described below in detail.

As shown in FIG. 9, the SCARA robot 500 includes the base 301, the first motor 2, the first speed reducer 303, the first arm 8, wiring 11, a motor holder 12, an oil seal 13, a stay 14, a clamp 15, the impeller 416, the motor cover 517, and a thermal conductor 518.

Impeller

The impeller 416 is an axial flow impeller. The impeller 416 rotates together with the first speed reducer 303. The impeller 416 is attached to an input 331 of the first speed reducer 303 and rotates together with the first speed reducer 303. The impeller 416 rotates about the same axis as a rotation axis J1 of an output 33 of the first speed reducer 303.

Motor Cover

The motor cover 517 is a housing that covers the first motor 2. The motor cover 517 includes a motor-side filter portion 517a. The motor-side filter portion 517a removes foreign matter from air while allowing the air to flow from an external space S1 of the base 301 to an internal space S2 of the base 301. The motor-side filter portion 517a is a slit. The motor-side filter portion 517a may be a filter.

Thermal Conductor

The thermal conductor 518 conducts heat from the first motor 2 to the motor cover 517. The first motor 2 and the motor cover 517 are connected to each other via the thermal conductor 518. The remaining structures of the fifth embodiment are similar to those of the fourth embodiment.

Advantageous Effects of Fifth Embodiment

According to the fifth embodiment, similarly to the third embodiment, the impeller 416 is operable to rotate together with the first speed reducer 303 and generate wind to cool the first motor 2. Accordingly, an increase in the number of components required to cool the first motor 2 and the complexity of the structure of the SCARA robot 500 can be reduced or prevented.

According to the fifth embodiment, as described above, the SCARA robot 500 includes the motor cover 517 to cover the first motor 2 and including the motor-side filter portion 517a to remove foreign matter from air while allowing the air to flow from the external space S1 of the base 301 to the internal space S2 of the base 301. Accordingly, adhesion of foreign matter to the first motor 2 can be reduced or prevented, and wind can be applied to the first motor 2. Thus, the first motor 2 can be effectively cooled.

According to the fifth embodiment, as described above, the first motor 2 and the motor cover 517 are in contact with each other via the thermal conductor 518. Accordingly, the heat of the first motor 2 can be released by the motor cover 517, and thus the first motor 2 can be effectively cooled. The remaining advantageous effects of the fifth embodiment are similar to the advantageous effects of the fourth embodiment.

Sixth Embodiment

The structure of a SCARA robot 600 according to a sixth embodiment is described with reference to FIG. 10. In the sixth embodiment, the SCARA robot 600 includes a motor cover 617, unlike the third embodiment. In the sixth embodiment, detailed description of the same or similar structures as those of the third embodiment is omitted.

The structure of the SCARA robot 600 according to the sixth embodiment of the present disclosure is described with reference to FIG. 10. The SCARA robot 600 is an example of a "robot" in the claims.

Structure of SCARA Robot

Figure 10:
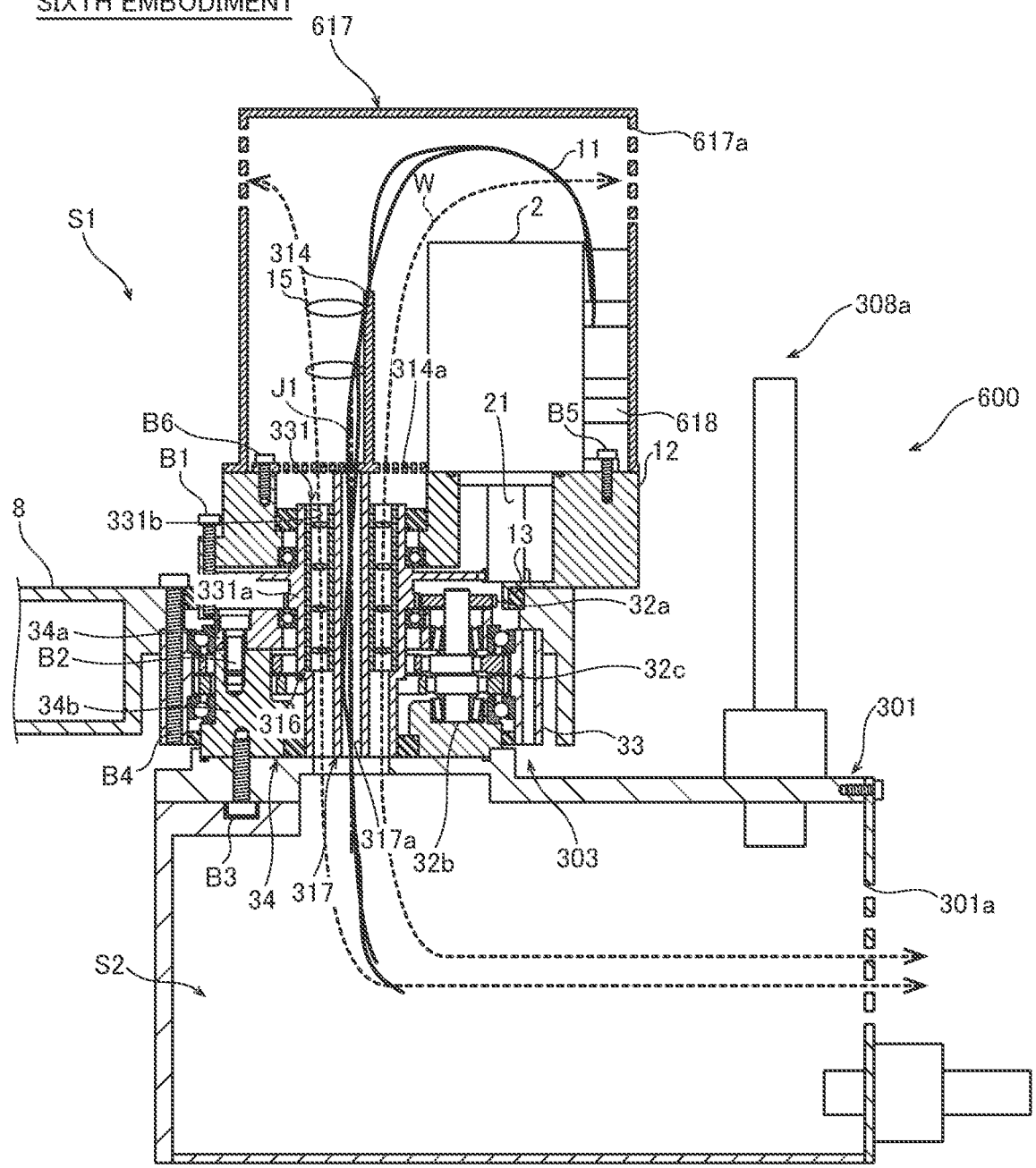
FIG. 10 is an enlarged sectional view of a joint portion connecting a base to a first arm of a SCARA robot according to a sixth embodiment.

As shown in FIG. 10, the SCARA robot 600 is a robot including arms that move in a horizontal direction. The SCARA robot 600 includes a base 301, a first motor 2, a first speed reducer 303, a second motor 4, a second speed reducer 5, a third motor 6, a fourth motor 7, a first arm 8, a second arm 9, and a working unit 10. The first motor 2 is an example of a "motor" in the claims. Furthermore, the first speed reducer 303 is an example of a "speed reducer" in the claims.

A first joint 308*a* is provided at a portion connecting the first arm 8 to the base 301. Furthermore, a second joint 9*a* (see FIG. 1) that is a portion connecting the first arm 8 to the second arm 9 is provided.

Joint Structure Connecting Base to First Arm

In the SCARA robot 600 according to the sixth embodiment, as shown in FIG. 10, an impeller 316 described below is rotated as the first speed reducer 303 rotates such that the first motor 2 and the first speed reducer 303 are cooled. Such a joint structure (first joint 308*a*) connecting the base 301 to the first arm 8 is described below in detail.

As shown in FIG. 10, the SCARA robot 600 includes the base 301, the first motor 2, the first speed reducer 303, the first arm 8, wiring 11, a motor holder 12, an oil seal 13, a stay 314, a clamp 15, the impeller 316, an insertion tube 317, the motor cover 617, and a thermal conductor 618.

Impeller

The impeller 316 is an axial flow impeller. The impeller 316 rotates together with the first speed reducer 303. The impeller 316 is attached to an input 331 of the first speed reducer 303 and rotates together with the first speed reducer 303. The impeller 316 rotates about the same axis as a rotation axis J1 of an output 33 of the first speed reducer 303.

Motor Cover

The motor cover 617 is a housing that covers the first motor 2. The motor cover 617 includes a motor-side filter portion 617*a*. The motor-side filter portion 617*a* removes foreign matter from air while allowing the air to flow from an external space S1 of the base 301 to an internal space S2 of the base 301. The motor-side filter portion 617*a* is a slit. The motor-side filter portion 617*a* may be a filter.

Thermal Conductor

The thermal conductor 618 conducts heat from the first motor 2 to the motor cover 617. The first motor 2 and the motor cover 617 are connected to each other via the thermal conductor 618. The remaining structures of the sixth embodiment are similar to those of the third embodiment.

Advantageous Effects of Sixth Embodiment

According to the sixth embodiment, similarly to the third embodiment, the impeller 316 is operable to rotate together with the first speed reducer 303 and generate wind to cool the first motor 2. Accordingly, an increase in the number of components required to cool the first motor 2 and the complexity of the structure of the SCARA robot 600 can be reduced or prevented. The remaining advantageous effects of the sixth embodiment are similar to the advantageous effects of the third embodiment.

Seventh Embodiment

The structure of a SCARA robot 700 according to a seventh embodiment is described with reference to FIG. 11. In the seventh embodiment, the SCARA robot 700 includes a motor cover 720, unlike the second embodiment. In the seventh embodiment, detailed description of the same or similar structures as those of the second embodiment is omitted.

The structure of the SCARA robot 700 according to the seventh embodiment of the present disclosure is described with reference to FIG. 11. The SCARA robot 700 is an example of a "robot" in the claims.

Structure of SCARA Robot

Figure 11:
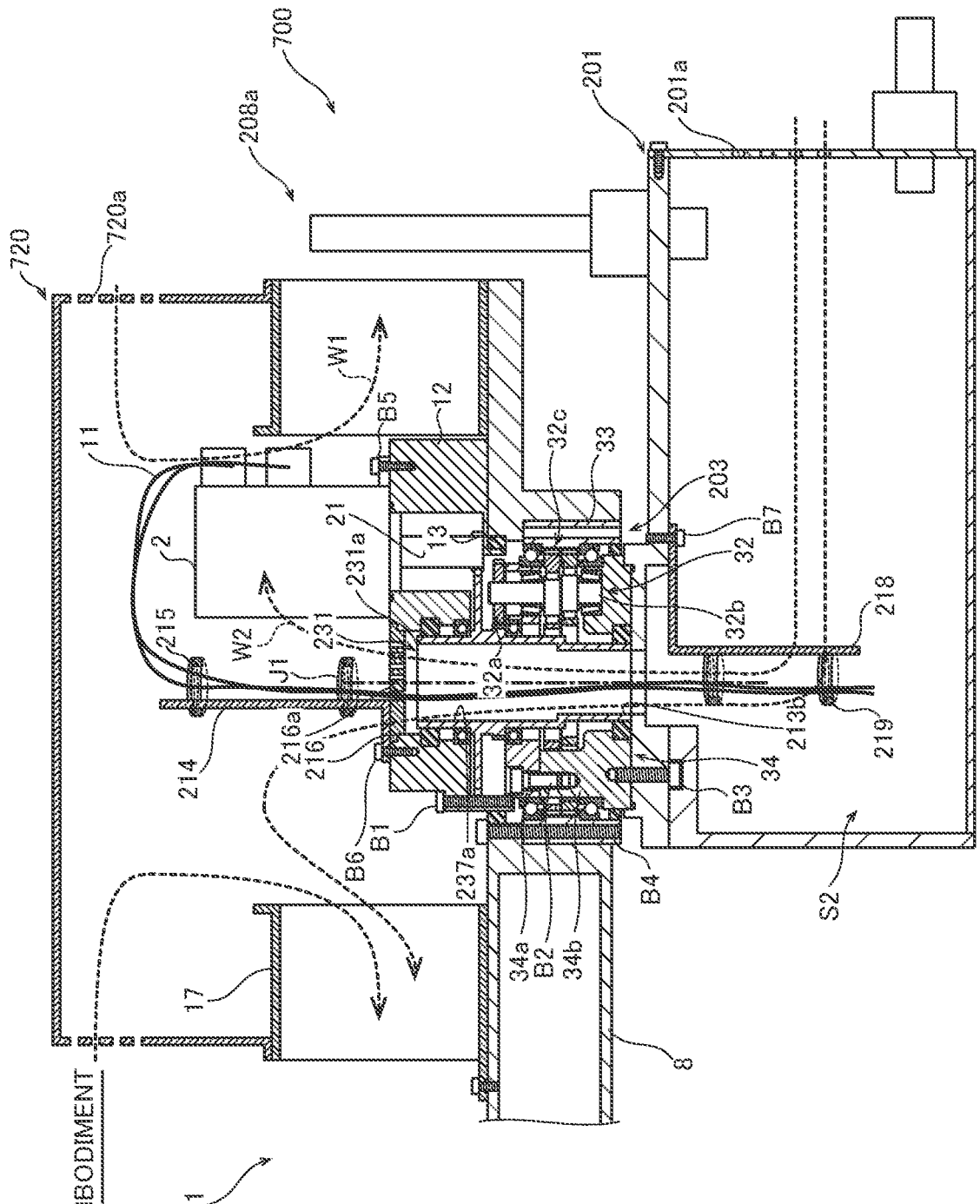
FIG. 11 is an enlarged sectional view of a joint portion connecting a base to a first arm of a SCARA robot according to a seventh embodiment.

As shown in FIG. 11, the SCARA robot 700 is a robot including arms that move in a horizontal direction. The SCARA robot 700 includes a base 201, a first motor 2, a first speed reducer 203, a second motor 4 (see FIG. 1), a second speed reducer 5 (see FIG. 1), a third motor 6 (see FIG. 1), a fourth motor 7 (see FIG. 1), a first arm 8, a second arm 9 (see FIG. 1), and a working unit 10 (see FIG. 1). The first motor 2 is an example of a "motor" in the claims. Furthermore, the first speed reducer 203 is an example of a "speed reducer" in the claims.

A first joint 208*a* is provided at a portion connecting the first arm 8 to the base 201. Furthermore, a second joint 9*a* (see FIG. 1) that is a portion connecting the first arm 8 to the second arm 9 is provided.

Joint Structure Connecting Base to First Arm

In the SCARA robot 700 according to the seventh embodiment, as shown in FIG. 11, an impeller 17 described below is rotated as the first arm 8 rotates such that the first motor 2 is cooled. Such a joint structure (first joint 208*a*) connecting the base 201 to the first arm 8 is described below in detail.

As shown in FIG. 11, the SCARA robot 700 includes the base 201, the first motor 2, the first speed reducer 203, the first arm 8, wiring 11, a motor holder 12, an oil seal 13, a first stay 214, a first clamp 215, a shaft cover 216, the impeller 17, a second stay 218, a second clamp 219, and the motor cover 720.

Impeller

The impeller 17 is a centrifugal impeller. The impeller 17 cools the first speed reducer 203 by rotating together with the first arm 8, generating wind, and causing the generated wind to flow into a through-hole 231*b* of a transmission shaft 231*a*.

Motor Cover

The motor cover 720 is a housing that covers the first motor 2. The motor cover 720 is attached to the side of the impeller 17 opposite to the base 201 side. The motor cover 720 includes a motor-side filter portion 720*a*. The motor-side filter portion 720*a* removes foreign matter from air while allowing the air to flow from an internal space S2 of the base 201 to an external space S1 of the base 201. The motor-side filter portion 720*a* is a slit. The motor-side filter portion 720*a* may be a filter. The remaining structures of the seventh embodiment are similar to those of the second embodiment.

Advantageous Effects of Seventh Embodiment

According to the seventh embodiment, similarly to the second embodiment, the impeller 17 is operable to rotate together with the first arm 8 and generate wind to cool the first motor 2. Accordingly, an increase in the number of components required to cool the first motor 2 and the complexity of the structure of the SCARA robot 700 can be reduced or prevented. The remaining advantageous effects of the seventh embodiment are similar to the advantageous effects of the second embodiment.

Eighth Embodiment

The structure of a SCARA robot 800 according to an eighth embodiment is described with reference to FIG. 12. In the eighth embodiment, the SCARA robot 800 includes a motor cover 820, unlike the second embodiment. In the eighth embodiment, detailed description of the same or similar structures as those of the second embodiment is omitted.

The structure of the SCARA robot 800 according to the eighth embodiment of the present disclosure is described with reference to FIG. 12. The SCARA robot 800 is an example of a "robot" in the claims.

Structure of SCARA Robot

Figure 12:
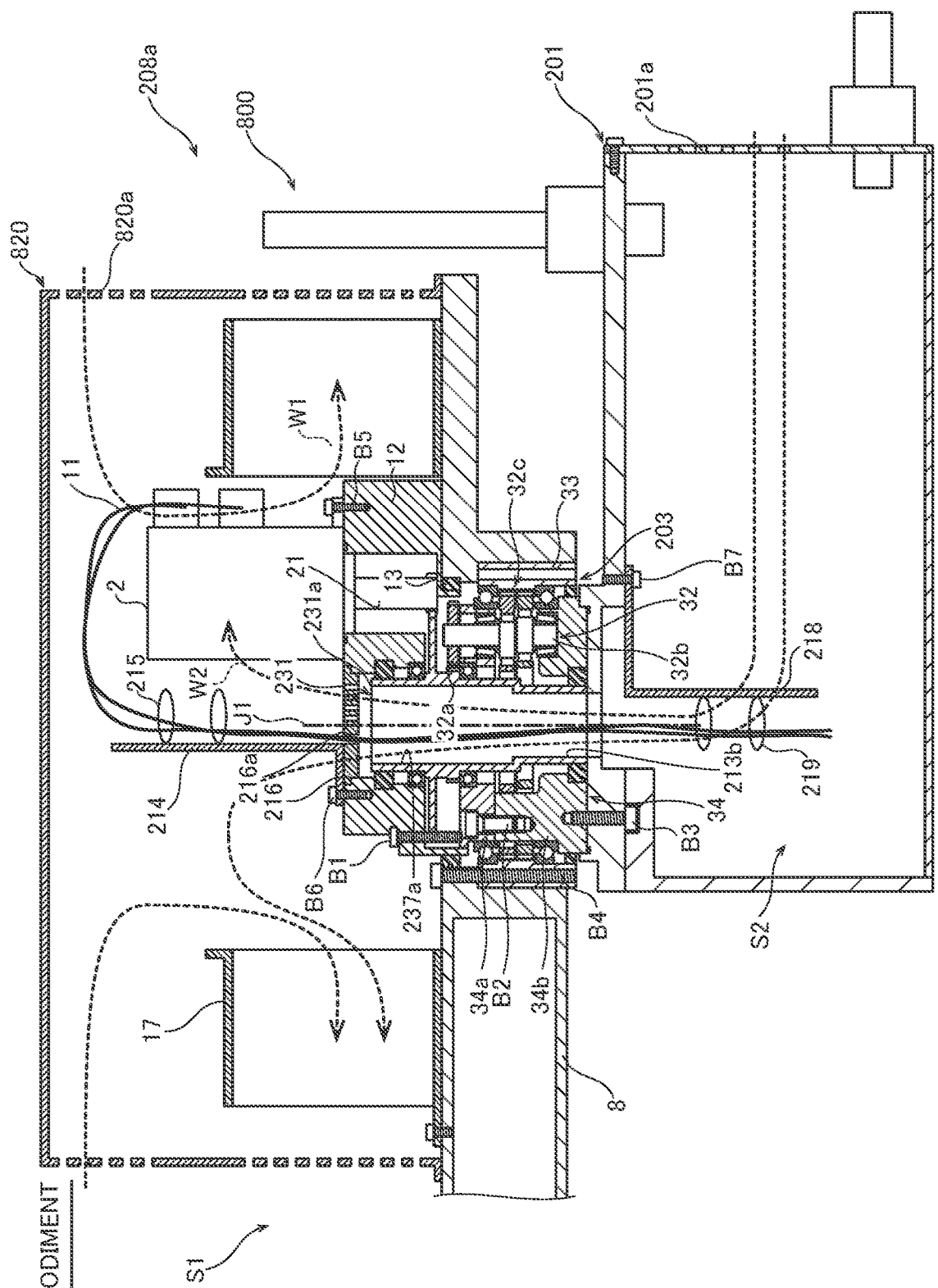
FIG. 12 is an enlarged sectional view of a joint portion connecting a base to a first arm of a SCARA robot according to an eighth embodiment.

As shown in FIG. 12, the SCARA robot 800 is a robot including arms that move in a horizontal direction. The SCARA robot 800 includes a base 201, a first motor 2, a first speed reducer 203, a second motor 4 (see FIG. 1), a second speed reducer 5 (see FIG. 1), a third motor 6 (see FIG. 1), a fourth motor 7 (see FIG. 1), a first arm 8, a second arm 9 (see FIG. 1), and a working unit 10 (see FIG. 1). The first motor 2 is an example of a "motor" in the claims. Furthermore, the first speed reducer 203 is an example of a "speed reducer" in the claims.

A first joint 208a is provided at a portion connecting the first arm 8 to the base 201. Furthermore, a second joint 9a (see FIG. 1) that is a portion connecting the first arm 8 to the second arm 9 is provided.

Joint Structure Connecting Base to First Arm

In the SCARA robot 800 according to the eighth embodiment, as shown in FIG. 12, an impeller 17 described below is rotated as the first arm 8 rotates such that the first motor 2 is cooled. Such a joint structure (first joint 208a) connecting the base 201 to the first arm 8 is described below in detail.

As shown in FIG. 12, the SCARA robot 800 includes the base 201, the first motor 2, the first speed reducer 203, the first arm 8, wiring 11, a motor holder 12, an oil seal 13, a first stay 214, a first clamp 215, a shaft cover 216, the impeller 17, a second stay 218, a second clamp 219, and the motor cover 820.

Impeller

The impeller 17 is a centrifugal impeller. The impeller 17 cools the first speed reducer 203 by rotating together with the first arm 8, generating wind, and causing the generated wind to flow into a through-hole 231b of a transmission shaft 231a.

Motor Cover

The motor cover 820 is a housing that covers the first motor 2 and the impeller 17. The motor cover 820 is attached to the side of the first arm 8 opposite to the base 201 side. The motor cover 820 includes a motor-side filter portion 820a. The motor-side filter portion 820a removes foreign matter from air while allowing the air to flow from an external space S1 of the base 201 to an internal space S2 of the base 201. The motor-side filter portion 820a is a slit. The motor-side filter portion 820a may be a filter. The remaining structures of the eighth embodiment are similar to those of the second embodiment.

Advantageous Effects of Eighth Embodiment

According to the eighth embodiment, similarly to the second embodiment, the impeller 17 is operable to rotate together with the first arm 8 and generate wind to cool the first motor 2. Accordingly, an increase in the number of components required to cool the first motor 2 and the complexity of the structure of the SCARA robot 800 can be reduced or prevented. The remaining advantageous effects of the eighth embodiment are similar to the advantageous effects of the second embodiment.

Ninth Embodiment

The structure of a SCARA robot 900 according to a ninth embodiment is described with reference to FIG. 13. In the ninth embodiment, the SCARA robot 900 does not include an insertion tube, unlike the fourth embodiment. In the ninth embodiment, detailed description of the same or similar structures as those of the fourth embodiment is omitted.

The structure of the SCARA robot 900 according to the ninth embodiment of the present disclosure is described with reference to FIG. 13. The SCARA robot 900 is an example of a "robot" in the claims.

Structure of SCARA Robot

Figure 13:
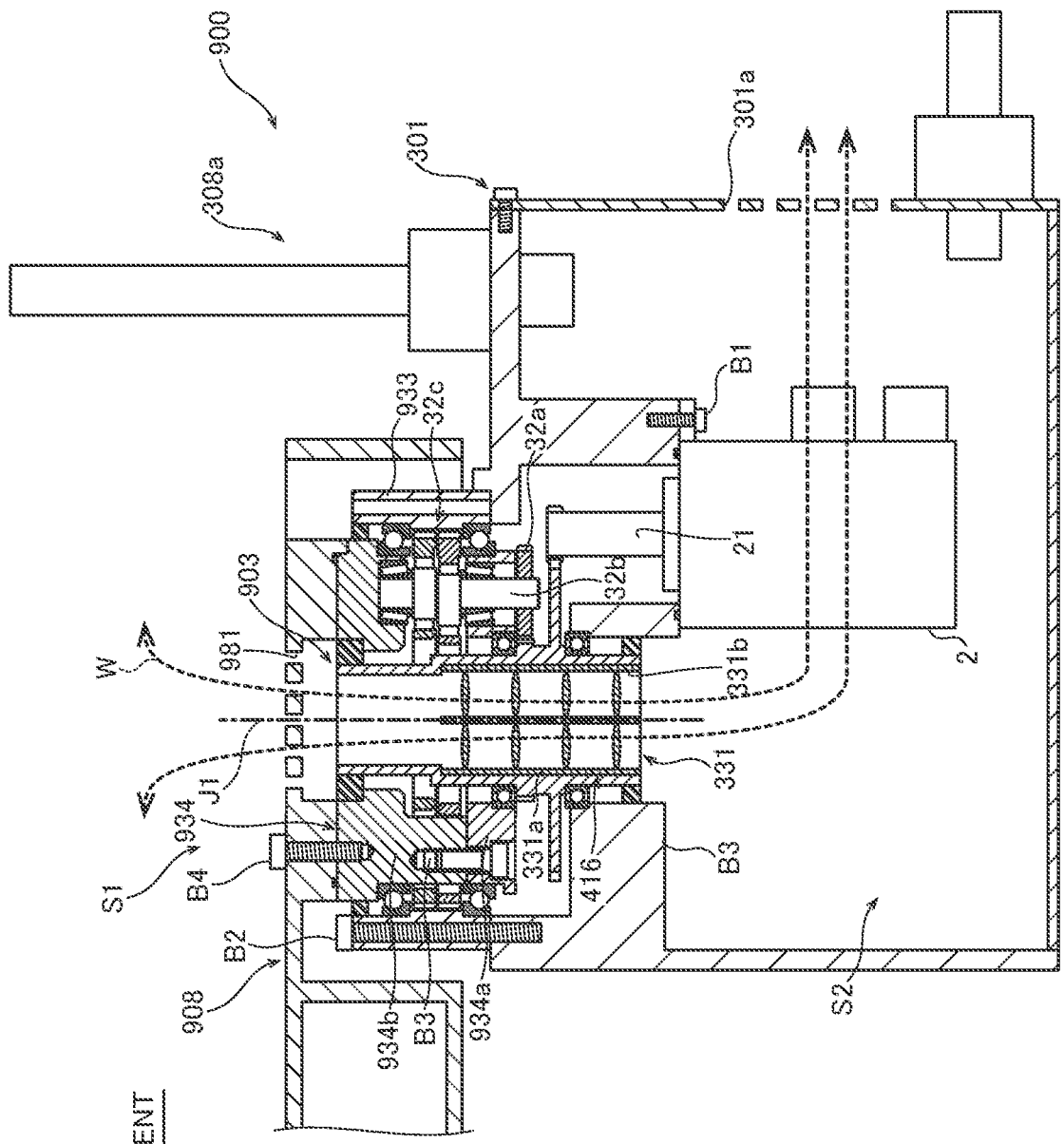
FIG. 13 is an enlarged sectional view of a joint portion connecting a base to a first arm of a SCARA robot according to a ninth embodiment.

As shown in FIG. 13, the SCARA robot 900 is a robot including arms that move in a horizontal direction. The SCARA robot 900 includes a base 301, a first motor 2, a first speed reducer 903, a second motor 4 (see FIG. 1), a second speed reducer 5 (see FIG. 1), a third motor 6 (see FIG. 1), a fourth motor 7 (see FIG. 1), a first arm 908, a second arm 9 (see FIG. 1), and a working unit 10 (see FIG. 1). The first motor 2 is an example of a "motor" in the claims. Furthermore, the first speed reducer 903 is an example of a "speed reducer" in the claims.

A first joint 308a is provided at a portion connecting the first arm 8 to the base 301. Furthermore, a second joint 9a (see FIG. 1) that is a portion connecting the first arm 8 to the second arm 9 is provided.

Joint Structure Connecting Base to First Arm

In the SCARA robot 900 according to the ninth embodiment, an impeller 416 described below is rotated as the first speed reducer 903 rotates such that the first motor 2 is cooled. Such a joint structure (first joint 308a) connecting the base 301 to the first arm 908 is described below in detail.

The first motor 2 is attached to the base 301. The first motor 2 is fastened to the base 301 by a fastening member B1. Thus, the first motor 2 is attached to the base 301 while being arranged in an internal space S2 of the base 301. Consequently, the first motor 2 does not rotate as the first arm 908 rotates.

The SCARA robot 900 includes the base 301, the first motor 2, the first speed reducer 903, the first arm 908, and the impeller 416.

The first speed reducer 903 is an eccentrically oscillating speed reducer. In particular, the first speed reducer 903 is an RV speed reducer. The first speed reducer 903 includes an input 331, a speed reduction portion 32, an outer case 933, and a carrier 934. The carrier 934 is an example of an "output" in the claims.

The outer case 933 is attached to the base 301 by a fastening member B2. Thus, the outer case 933 does not rotate due to a driving force from the speed reduction portion 32.

The carrier 934 is arranged inside the outer case 933. The carrier 934 rotates by the driving force from the speed reduction portion 32 to rotate the first arm 908. The carrier 934 is attached to the first arm 908.

Specifically, the carrier 934 includes a first carrier portion 934a and a second carrier portion 934b. The first carrier portion 934a is provided on the base 301 side in a direction in which a rotation axis J1 of the input 331 extends. The second carrier portion 934b is connected to the first carrier portion 934a by a fastening member B3 and a pin (not shown), for example. The second carrier portion 934b is provided on the opposite side to the base 301 side in the direction in which the rotation axis J1 of the input 331 extends. The second carrier portion 934b is attached to the first arm 908. That is, the second carrier portion 934b is fixed to the first arm 908 by a fastening member B4.

The first arm 908 rotates together with the carrier 934 when the carrier 934 is connected thereto. The first arm 908 is attached to the carrier 934 by the fastening member B4.

The first arm 908 includes an arm-side filter portion 981. The arm-side filter portion 981 removes foreign matter from air while allowing the air to flow from an external space S1 of the base 301 to the internal space S2 of the base 301. The arm-side filter portion 981 is a slit. The arm-side filter portion 981 may be a filter.

Impeller

The impeller 416 is an axial flow impeller. The impeller 416 rotates together with the first speed reducer 903. Thus, the impeller 416 sends wind to the first motor 2 arranged in the internal space S2 of the base 301. The remaining structures of the ninth embodiment are similar to those of the fourth embodiment.

Advantageous Effects of Ninth Embodiment

According to the ninth embodiment, similarly to the fourth embodiment, the impeller 416 is operable to rotate together with the first speed reducer 903 and generate wind to cool the first motor 2. Accordingly, an increase in the number of components required to cool the first motor 2 and the complexity of the structure of the SCARA robot 900 can be reduced or prevented.

According to the ninth embodiment, as described above, the SCARA robot 900 includes the first joint 308a that is a portion connecting the first arm 8 to the base 301, and the second joint 9a that is a portion connecting the first arm 8 to the second arm 9. The first motor 2 is attached to the base 301 while being arranged in the internal space S2 of the base 301. The axial flow impeller is operable to send wind to the first motor 2 arranged in the internal space S2 of the base 301. Accordingly, even when the first motor 2 is arranged in the internal space S2 of the base 301, the axial flow impeller can apply wind to the first motor 2, and thus the first motor 2 can be effectively cooled. The remaining advantageous effects of the ninth embodiment are similar to the advantageous effects of the fourth embodiment.

Tenth Embodiment

The structure of a SCARA robot 1000 according to a tenth embodiment is described with reference to FIG. 14. In the tenth embodiment, the SCARA robot 1000 includes a harmonic speed reducer as a speed reducer, unlike the ninth embodiment. In the tenth embodiment, detailed description of the same or similar structures as those of the ninth embodiment is omitted.

The structure of the SCARA robot 1000 according to the tenth embodiment of the present disclosure is described with reference to FIG. 14. The SCARA robot 1000 is an example of a "robot" in the claims.

Structure of SCARA Robot

Figure 14:
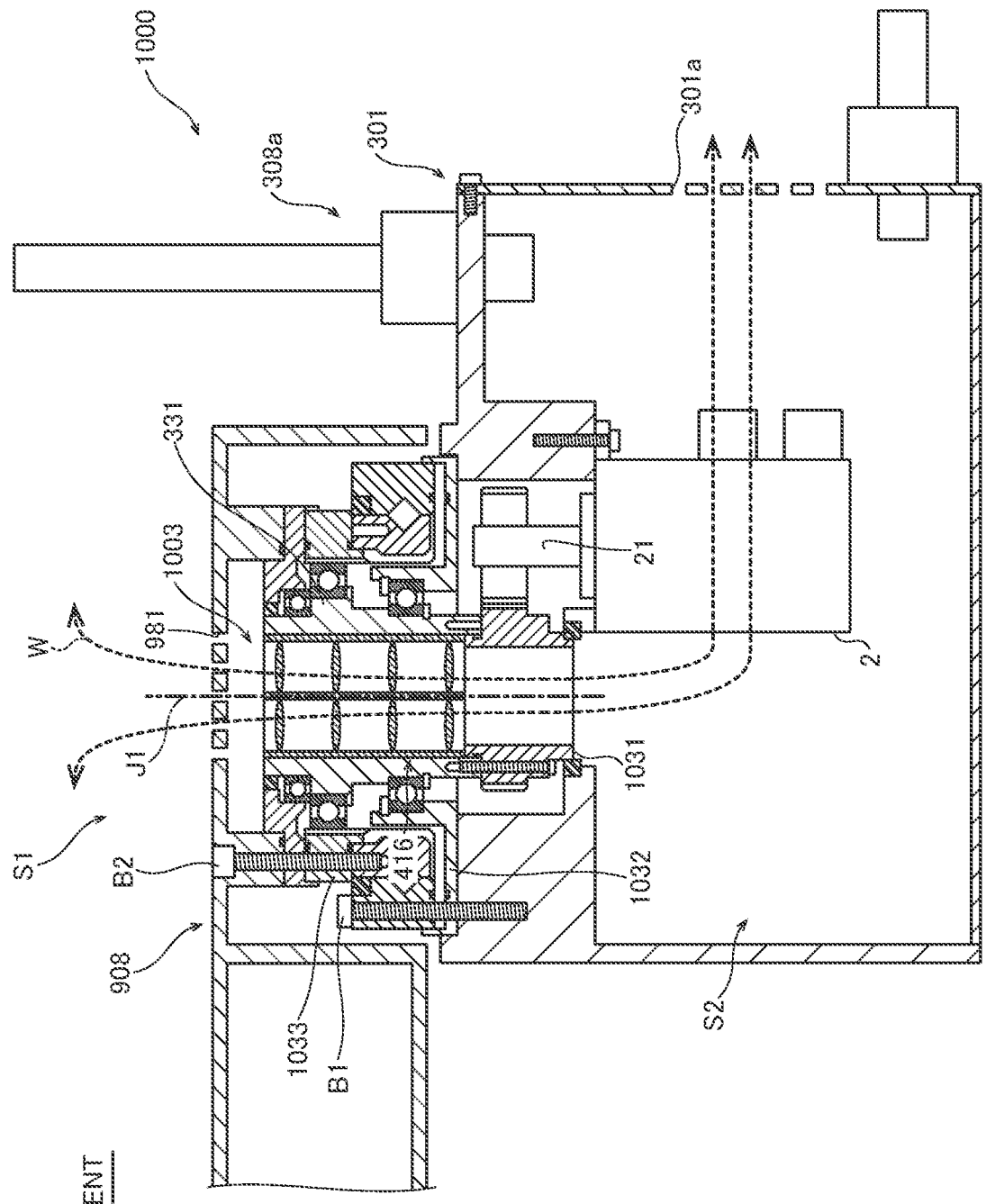
FIG. 14 is an enlarged sectional view of a joint portion connecting a base to a first arm of a SCARA robot according to a tenth embodiment.

As shown in FIG. 14, the SCARA robot 1000 is a robot including arms that move in a horizontal direction. The SCARA robot 1000 includes a base 301, a first motor 2, a first speed reducer 1003, a second motor 4 (see FIG. 1), a second speed reducer 5 (see FIG. 1), a third motor 6 (see FIG. 1), a fourth motor 7 (see FIG. 1), a first arm 908, a second arm 9 (see FIG. 1), and a working unit 10 (see FIG. 1). The first motor 2 is an example of a "motor" in the claims. Furthermore, the first speed reducer 1003 is an example of a "speed reducer" in the claims.

A first joint 308a is provided at a portion connecting the first arm 8 to the base 301. Furthermore, a second joint 9a (see FIG. 1) that is a portion connecting the first arm 8 to the second arm 9 is provided.

Joint Structure Connecting Base to First Arm

In the SCARA robot 1000 according to the tenth embodiment, an impeller 416 described below is rotated as the first speed reducer 1003 rotates such that the first motor 2 is cooled. Such a joint structure (first joint 308a) connecting the base 301 to the first arm 908 is described below in detail.

The first speed reducer 1003 is a hollow speed reducer. In particular, the first speed reducer 1003 is a harmonic speed reducer. The first speed reducer 1003 includes an input 331, a fixed portion 1032 below a flex spline, and an output 1033 above a circular spline.

The input 331 is a wave generator. The fixed portion 1032 is attached to the base 301 by a fastening member B1. The output 1033 is attached to the first arm 908 by a fastening member B2. The output 1033 slows down and outputs rotation of the input 331. Thus, the output 1033 also functions as a speed reduction portion. The output 1033 is an example of a "speed reduction portion" in the claims. The remaining structures of the tenth embodiment are similar to those of the ninth embodiment.

Advantageous Effects of Tenth Embodiment

According to the tenth embodiment, similarly to the ninth embodiment, the impeller 416 is operable to rotate together with the first speed reducer 1003 and generate wind to cool the first motor 2. Accordingly, an increase in the number of components required to cool the first motor 2 and the complexity of the structure of the SCARA robot 1000 can be reduced or prevented. The remaining advantageous effects of the tenth embodiment are similar to the advantageous effects of the ninth embodiment.

Eleventh Embodiment

The structure of a SCARA robot 1100 according to an eleventh embodiment is described with reference to FIGS. 15 to 19. In the eleventh embodiment, an impeller 1117 includes movable blades 1117c, unlike the first embodiment. In the eleventh embodiment, detailed description of the same or similar structures as those of the first embodiment is omitted.

The structure of the SCARA robot 1100 according to the eleventh embodiment of the present disclosure is described with reference to FIGS. 15 to 19. The SCARA robot 1100 is an example of a "robot" in the claims.

Structure of SCARA Robot

The SCARA robot 1100 is a robot including arms that move in a horizontal direction. The SCARA robot 1100 includes a base 1 (see FIG. 1), a first motor 2, a first speed reducer 3 (see FIG. 1), a second motor 4 (see FIG. 1), a second speed reducer 5 (see FIG. 1), a third motor 6 (see FIG. 1), a fourth motor 7 (see FIG. 1), a first arm 8 (see FIG. 1), a second arm 9 (see FIG. 1), and a working unit 10 (see FIG. 1). The first motor 2 is an example of a "motor" in the claims. Furthermore, the first speed reducer 3 is an example of a "speed reducer" in the claims.

Joint Structure Connecting Base to First Arm

Figure 15:
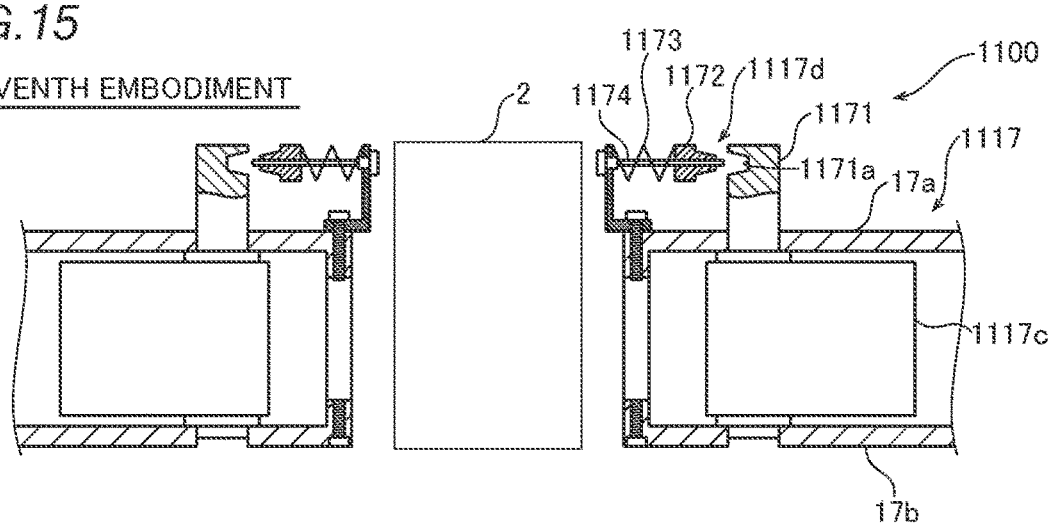
FIG. 15 is a sectional view of an impeller of a SCARA robot according to an eleventh embodiment.

In the SCARA robot 1100 according to the eleventh embodiment, as shown in FIG. 15, the impeller 1117 described below is rotated as the first arm 8 rotates such that the first motor 2 is cooled. Such a joint structure connecting the base 1 to the first arm 8 is described below in detail.

The SCARA robot 1100 includes the base 1 (see FIG. 3), the first motor 2 (see FIG. 3), the first speed reducer 3 (see FIG. 3), the first arm 8 (see FIG. 3), wiring 11 (see FIG. 3), a motor holder 12 (see FIG. 3), an oil seal 13 (see FIG. 3), a stay 14 (see FIG. 3), a clamp 15 (see FIG. 3), a grommet 16 (see FIG. 3), and the impeller 1117.

Impeller

The impeller 1117 is a centrifugal impeller. The impeller 1117 includes a first mount 17a, a second mount 17b, a plurality of (six) movable blades 1117c, a plurality of (six) stoppers 1117d, and a plurality of stoppers 1117e.

The first mount 17a is attached to a portion of each of a plurality of blades 17c on the side opposite to the base 1. The second mount 17b is attached to a portion of each of the plurality of blades 17c on the base 1 side.

Figure 16:
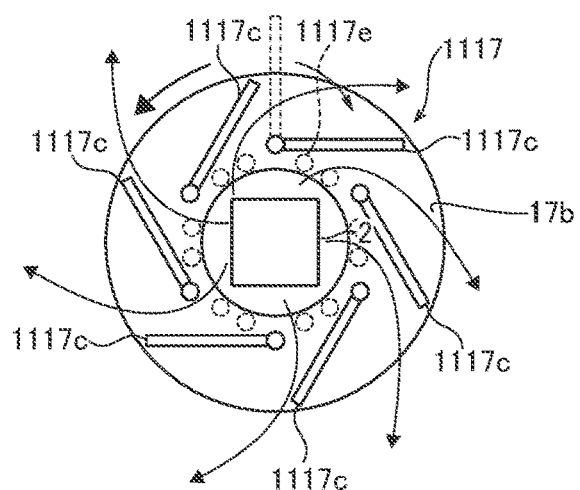
FIG. 16 is a schematic view showing a state in which the impeller of the SCARA robot according to the eleventh embodiment rotates counterclockwise.
Figure 17:
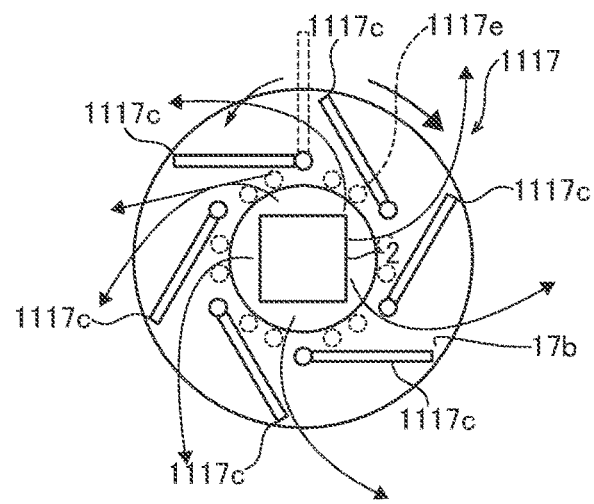
FIG. 17 is a schematic view showing a state in which the impeller of the SCARA robot according to the eleventh embodiment rotates clockwise.

As shown in FIGS. 16 and 17, each of the plurality of movable blades 1117c rotates about a rotation shaft 1171 described below. When the impeller 1117 rotates in a first rotation direction of the impeller 1117, each of the plurality of movable blades 1117c is tilted in a second rotation direction due to an inertial force accompanying the rotation of the impeller 1117 and the fluid force of wind flowing between the plurality of movable blades 1117c. When the impeller 1117 rotates in the second rotation direction of the impeller 1117, each of the plurality of movable blades 1117c is tilted in the first rotation direction due to an inertial force accompanying the rotation of the impeller 1117 and the fluid force of wind flowing between the plurality of movable blades 1117c. Each of the plurality of movable blades 1117c has a thin plate shape.

The stoppers 1117d maintain the tilted postures of the corresponding movable blades 1117c. Specifically, each of the stoppers 1117d includes the rotation shaft 1171, a wedge 1172, a tension spring 1173, and a guide shaft 1174.

Figure 18:
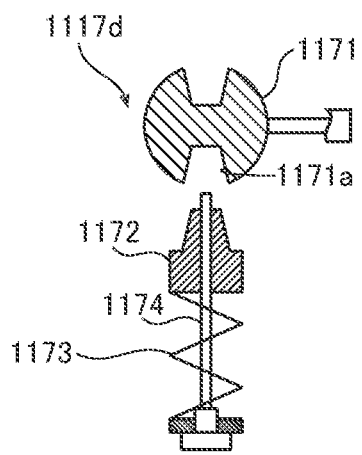
FIG. 18 is a schematic view showing a state in which rotation of the impeller is not stopped by a stopper of the SCARA robot according to the eleventh embodiment.
Figure 19:
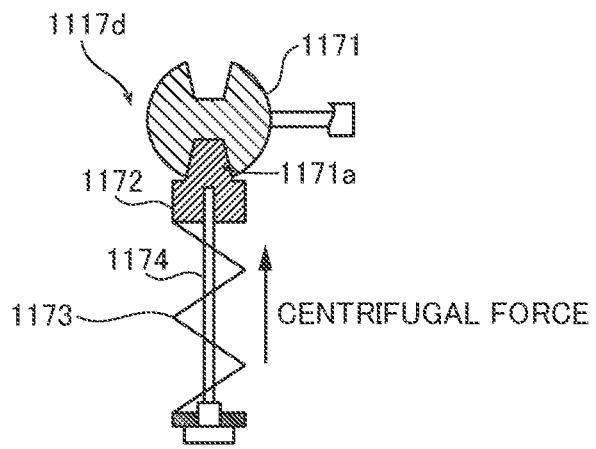
FIG. 19 is a schematic view showing a state in which rotation of the impeller is stopped by the stopper of the SCARA robot according to the eleventh embodiment.

As shown in FIGS. 18 and 19, the rotation shaft 1171 includes a notch 1171a. The notch 1171a is formed to match the shape of the wedge 1172 such that the wedge 1172 can be inserted therein. The wedge 1172 restricts rotation of the rotation shaft 1171 by being inserted into the notch 1171a. The wedge 1172 is a relatively heavy member, and moves outward in the radial direction of the impeller 1117 due to a centrifugal force accompanying rotation of the impeller 1117. The tension spring 1173 urges the wedge 1172 inward in the radial direction of the impeller 1117. The guide shaft 1174 guides movement of the wedge 1172 outward and inward in the radial direction of the impeller 1117.

As shown in FIGS. 16 and 17, the stoppers 1117e restrict rotation of the corresponding movable blades 1117c. Thus, the rotation of the movable blades 1117c is restricted and stopped by the stoppers 1117e, and thus the wedge 1172 can be inserted into the notch 1171a. The remaining structures of the eleventh embodiment are similar to those of the first embodiment.

Advantageous Effects of Eleventh Embodiment

According to the eleventh embodiment, similarly to the first embodiment, the impeller 1117 is operable to rotate together with the first arm 8 and generate wind to cool the first motor 2. Accordingly, an increase in the number of components required to cool the first motor 2 and the complexity of the structure of the SCARA robot 1100 can be reduced or prevented.

According to the eleventh embodiment, as described above, the impeller 1117 includes the plate-shaped movable blades 1117c that are tilted in the first rotation direction of the impeller 1117 when the impeller 1117 rotates in the second rotation direction of the impeller 1117, and are tilted in the second rotation direction of the impeller 1117 when the impeller 1117 rotates in the first rotation direction of the impeller 1117. Accordingly, regardless of the rotation direction of the impeller 1117, the air volume of the impeller 1117 can be maintained substantially constant when the rotation speed is the same, and thus the first motor 2 can be efficiently cooled by the impeller 1117.

According to the eleventh embodiment, as described above, the impeller 1117 includes the stoppers 1117d to maintain the tilted postures of the movable blades 1117c. Accordingly, the air volume of the impeller 1117 can be more reliably maintained substantially constant, and thus the first motor 2 can be more efficiently cooled by the impeller 1117. The remaining advantageous effects of the eleventh embodiment are similar to the advantageous effects of the first embodiment.

Twelfth Embodiment

The structure of a SCARA robot 1200 according to a twelfth embodiment is described with reference to FIGS. 20 to 23. In the twelfth embodiment, an impeller 1216 includes movable blades 1216c, unlike the fourth embodiment. In the twelfth embodiment, detailed description of the same or similar structures as those of the fourth embodiment is omitted.

The structure of the SCARA robot 1200 according to the twelfth embodiment of the present disclosure is described with reference to FIGS. 20 to 23. The SCARA robot 1200 is an example of a "robot" in the claims.

Structure of SCARA Robot

The SCARA robot 1200 is a robot including arms that move in a horizontal direction. The SCARA robot 1200 includes a base 301 (see FIG. 8), a first motor 2 (see FIG. 8), a first speed reducer 303 (see FIG. 8), a second motor 4 (see FIG. 1), a second speed reducer 5 (see FIG. 1), a third motor 6 (see FIG. 1), a fourth motor 7 (see FIG. 1), a first arm 8 (see FIG. 8), a second arm 9 (see FIG. 1), and a working unit 10 (see FIG. 1). The first motor 2 is an example of a "motor" in the claims. Furthermore, the first speed reducer 303 is an example of a "speed reducer" in the claims.

Joint Structure Connecting Base to First Arm

In the SCARA robot 1200 according to the twelfth embodiment, the impeller 1216 described below is rotated as the first speed reducer 303 rotates such that the first motor 2 is cooled. Such a joint structure connecting the base 301 to the first arm 8 is described below in detail.

The SCARA robot 1200 includes the base 301, the first motor 2, the first speed reducer 303, the first arm 8, wiring 11 (see FIG. 8), a motor holder 12 (see FIG. 8), an oil seal 13 (see FIG. 8), a stay 14 (see FIG. 8), a clamp 15 (see FIG. 8), the impeller 1216, and a shaft cover 417 (see FIG. 8).

Impeller

Figure 20:
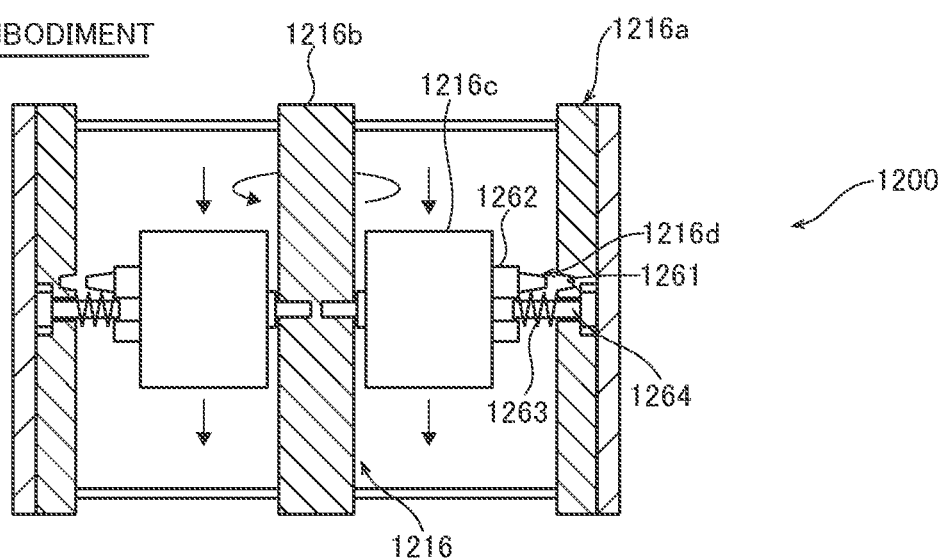
FIG. 20 is a schematic view showing a state in which rotation of an impeller is not stopped by a stopper of a SCARA robot according to a twelfth embodiment.
Figure 21:
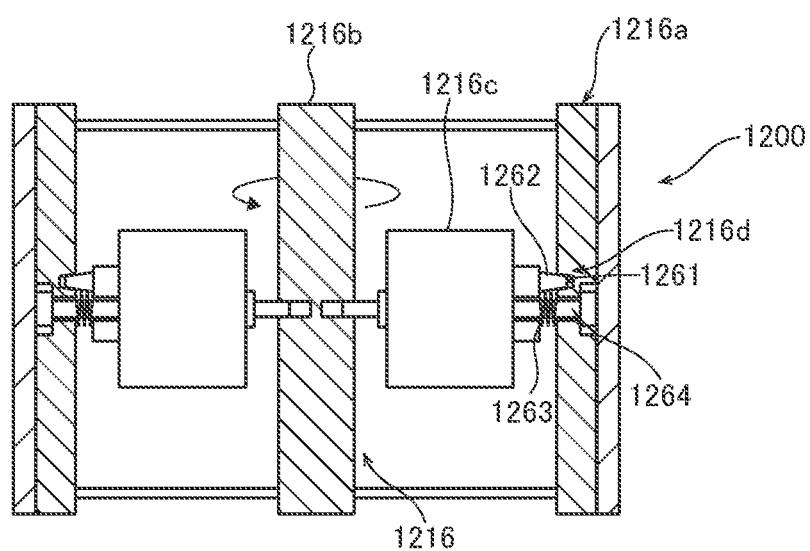
FIG. 21 is a schematic view showing a state in which rotation of the impeller is stopped by the stopper of the SCARA robot according to the twelfth embodiment.

As shown in FIGS. 20 and 21, the impeller 1216 is an axial flow impeller. The impeller 1216 includes an outer frame 1216a, a rotation shaft 1216b, a plurality of (two) movable blades 1216c, a plurality of (two) stoppers 1216d, and stoppers 1216e.

The outer frame 1216a is a frame that accommodates the plurality of movable blades 1216c. The plurality of movable blades 1216c are rotatably attached to the rotation shaft 1216b.

Figure 22:
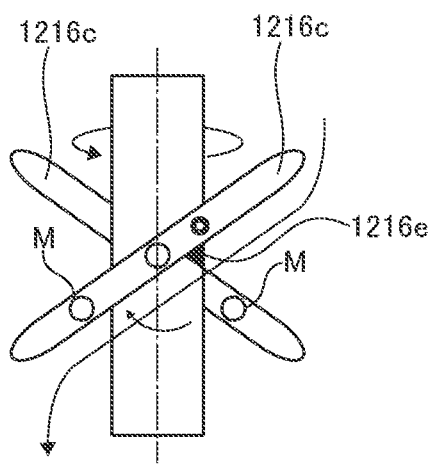
FIG. 22 is a schematic view showing a state in which movable blades of the SCARA robot according to the twelfth embodiment are tilted in one direction.
Figure 23:
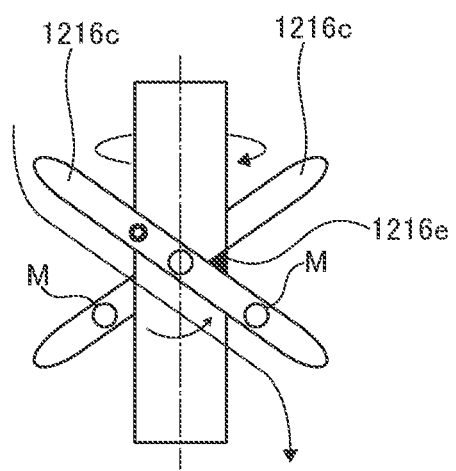
FIG. 23 is a schematic view showing a state in which the movable blades of the SCARA robot according to the twelfth embodiment are tilted in another direction.

As shown in FIGS. 22 and 23, each of the plurality of movable blades 1216c rotates about the rotation shaft 1216b. A weight M is attached to each of the plurality of movable blades 1216c. The weight M is arranged on one side in a direction in which the rotation shaft 1216b extends.

When the impeller 1216 rotates in a first rotation direction of the impeller 1216, an end of each of the plurality of movable blades 1216c on the weight M side moves in a second rotation direction of the impeller 1216 due to an inertial force accompanying the rotation of the impeller 1216 and the fluid force of wind flowing between the plurality of movable blades 1216c. Thus, each of the plurality of movable blades 1216c is tilted in the second rotation direction. When the impeller 1216 rotates in the second rotation direction of the impeller 1216, the end of each of the plurality of movable blades 1216c on the weight M side moves in the first rotation direction of the impeller 1216 due to an inertial force accompanying the rotation of the impeller 1216 and the fluid force of wind flowing between the plurality of movable blades 1216c. Thus, each of the plurality of movable blades 1216c is tilted in the first rotation direction. Each of the plurality of movable blades 1216c has a thin plate shape.

Thus, the weight M is attached to one side of each of the plurality of movable blades 1216c such that air flowing through the impeller 1216 is directed to one side on which the weight M is arranged, in the direction in which the rotation shaft 1216b extends.

As shown in FIGS. 20 and 21, the stoppers 1216d maintain the tilted postures of the corresponding movable blades 1216c. Specifically, each of the stoppers 1216d includes a notch 1261, a wedge 1262, a spring 1263, and a shaft 1264.

The notch 1261 is formed in the outer frame 1216a. The notch 1261 is formed to match the shape of the wedge 1262 such that the wedge 1262 can be inserted therein. The wedge 1262 restricts rotation of the movable blade 1216c by being inserted into the notch 1261. The wedge 1262 moves outward in the radial direction of the impeller 1216 due to a centrifugal force exerted on the mass of the movable blade 1216c accompanying rotation of the rotation shaft 1216b. The spring 1263 is attached to the shaft 1264. The spring 1263 urges the movable blade 1216c inserted into the notch 1261 inward in the radial direction of the impeller 1216. The shaft 1264 positions the movable blade 1216c in order to insert the wedge 1262 into the notch 1261.

As shown in FIGS. 22 and 23, the stoppers 1216e restrict rotation of the corresponding movable blades 1216c. Thus, rotation of the movable blades 1216c is restricted and stopped by the stoppers 1216e, and thus the wedge 1262 can be inserted into the notch 1261. The remaining structures of the twelfth embodiment are similar to those of the first embodiment.

Advantageous Effects of Twelfth Embodiment

According to the twelfth embodiment, similarly to the fourth embodiment, the impeller 1216 is operable to rotate together with the first speed reducer 303 and generate wind to cool the first motor 2. Accordingly, an increase in the number of components required to cool the first motor 2 and the complexity of the structure of the SCARA robot 1200 can be reduced or prevented. The remaining advantageous effects of the twelfth embodiment are similar to the advantageous effects of the fourth embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the impeller 17 is attached to the first arm 8 in the joint structure connecting the base 1 to the first arm 8 has been shown in each of the aforementioned first, second, seventh, and eighth embodiments, the present disclosure is not restricted to this. In the present disclosure, the impeller may be attached to the second arm in a joint structure connecting the first arm to the second arm.

While the example in which the "robot" in the claims is a SCARA robot 100 (200, 300, 400, 500, 600, 700, 800, 900, 1000, 1100, 1200) has been shown in each of the aforementioned first to twelfth embodiments, the present disclosure is not restricted to this. In the present disclosure, the robot may be a vertical articulated robot or a single-axis robot.

Figure 24:
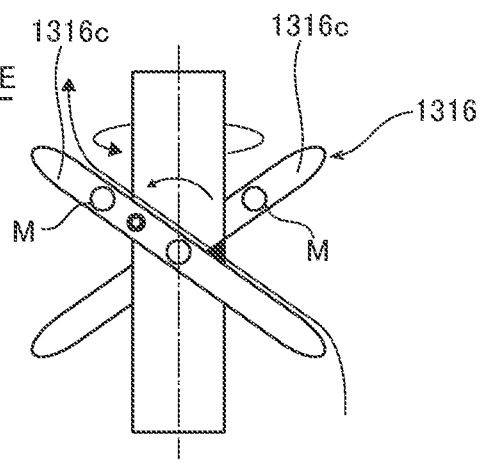
FIG. 24 is a schematic view showing a state in which movable blades of a SCARA robot according to a first modified example of the twelfth embodiment are tilted in one direction.
Figure 25:
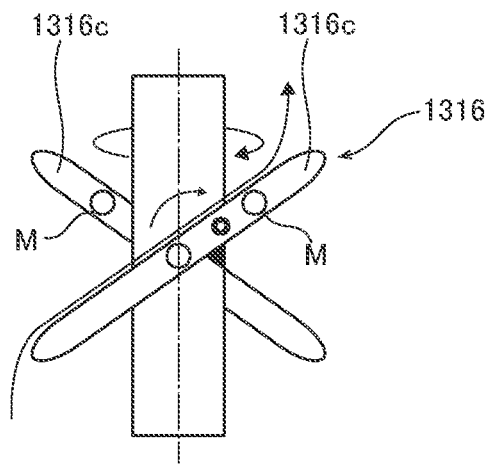
FIG. 25 is a schematic view showing a state in which the movable blades of the SCARA robot according to the first modified example of the twelfth embodiment are tilted in another direction.

While the example in which the weight M is attached to one side of each of the plurality of movable blades 1216c such that air flowing through the impeller 1216 is directed to one side on which the weight M is arranged, in the direction in which the rotation shaft 1216b extends has been shown in the aforementioned twelfth embodiment, the present disclosure is not restricted to this. In the present disclosure, as in a first modified example shown in FIGS. 24 and 25, a weight M may be attached to another side of each of a plurality of movable blades 1316c such that air flowing through an impeller 1316 is directed to another side on which the weight M is arranged, in a direction in which a rotation shaft extends.

Figure 26:
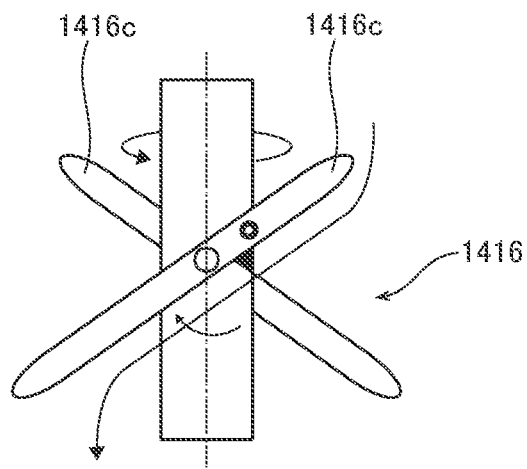
FIG. 26 is a schematic view showing a state in which movable blades of a SCARA robot according to a second modified example of the twelfth embodiment are tilted in one direction.
Figure 27:
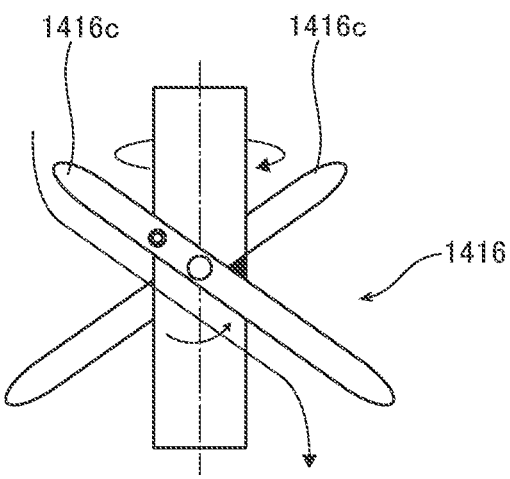
FIG. 27 is a schematic view showing a state in which the movable blades of the SCARA robot according to the second modified example of the twelfth embodiment are tilted in another direction.
Figure 28:
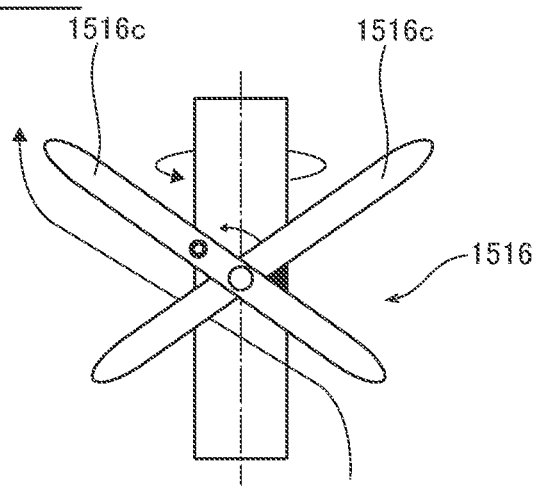
FIG. 28 is a schematic view showing a state in which movable blades of a SCARA robot according to a third modified example of the twelfth embodiment are tilted in one direction.
Figure 29:
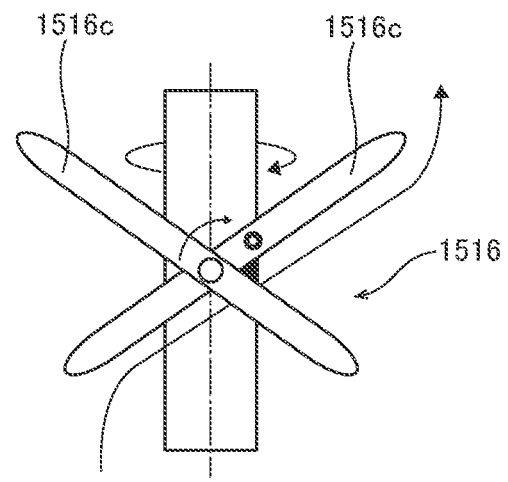
FIG. 29 is a schematic view showing a state in which the movable blades of the SCARA robot according to the third modified example of the twelfth embodiment are tilted in another direction.

While the example in which the weight M is attached to each of the plurality of movable blades 1216c has been shown in the aforementioned twelfth embodiment, the present disclosure is not restricted to this. In the present disclosure, as in a second modified example shown in FIGS. 26 and 27, instead of attaching a weight, one side of each of a plurality of movable blades 1416c may be made longer than another side of each of the plurality of movable blades 1416c. Alternatively, as in a third modified example shown in FIGS. 28 and 29, instead of attaching a weight, another side of each of a plurality of movable blades 1516c may be made longer than one side of each of the plurality of movable blades 1516c.

Figure 30:
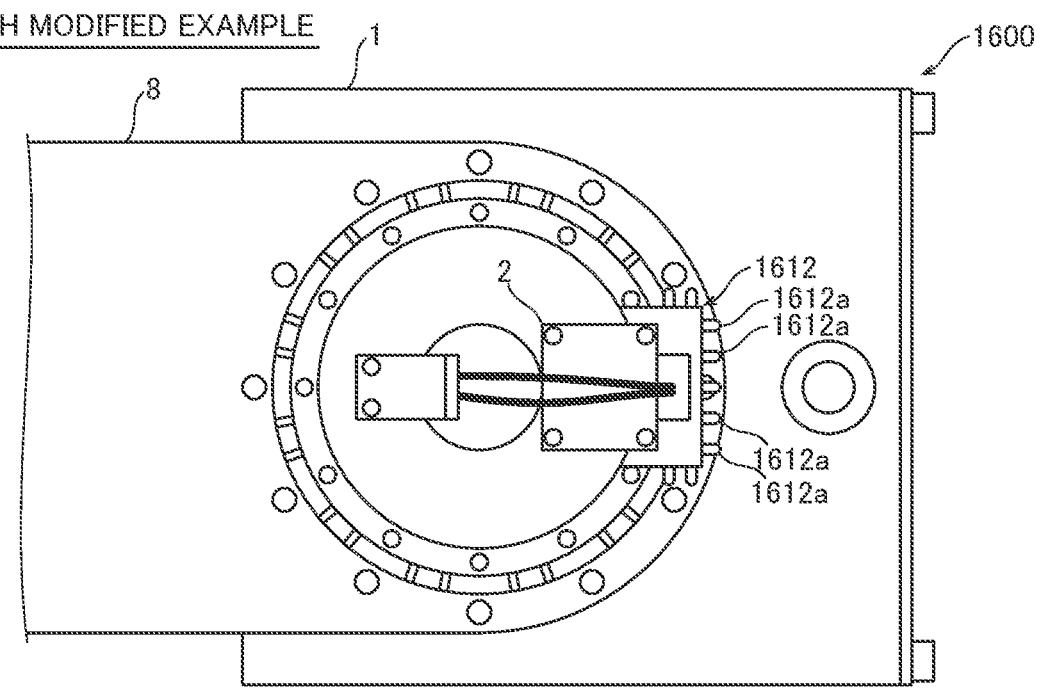
FIG. 30 is a plan view showing a motor holder including fins in a SCARA robot according to a fourth modified example of the first to twelfth embodiments.

While the example in which the motor holder 12 does not include cooling fins has been shown in each of the aforementioned first to eighth embodiments, the present disclosure is not restricted to this. In the present disclosure, as in a fourth modified example shown in FIG. 30, a SCARA robot 1600 may include a motor holder 1612 including convex cooling fins 1612a arranged in an air passage W. Accordingly, a first motor 2 can be cooled by the cooling fins 1612a of the motor holder 1612, and thus the first motor 2 can be more effectively cooled.

While the example in which the first motor 2 (motor) and the motor cover 517 are in contact with each other via the thermal conductor 518 has been shown in the aforementioned fifth embodiment, the present disclosure is not restricted to this. In the present disclosure, the motor and the motor cover may be in direct contact with each other. Accordingly, the motor can be cooled by the motor cover, and thus the motor can be effectively cooled.

While the example in which the first speed reducer 3 (speed reducer) is an RV speed reducer has been shown in each of the aforementioned first to ninth, eleventh, and twelfth embodiments, the present disclosure is not restricted to this. In the present disclosure, the speed reducer may be a cyclo speed reducer (registered trademark).

What is claimed is:

1. A robot comprising:
   a motor;
   a speed reducer including an input operable to rotate by a driving force of the motor, a speed reduction portion to slow down and transmit rotation from the input, and an output operable to rotate by a driving force from the speed reduction portion;
   a base;
   a first arm relatively rotatably attached to the base to rotate by an output from the output of the speed reducer;
   a second arm relatively rotatably attached to the first arm; and
   an impeller operable to rotate together with the first arm; wherein
   the impeller is operable to rotate together with the first arm or the speed reducer and generate wind to cool the motor; and
   the impeller is a centrifugal impeller, and the centrifugal impeller surrounds the motor.

2. The robot according to claim 1, wherein the impeller is attached to the first arm to rotate together with the first arm or is attached to the input of the speed reducer to rotate together with the input.

3. The robot according to claim 1, wherein
   the input includes a hollow transmission shaft including a through-hole that penetrates in a direction in which a rotation axis of the input extends and operable to transmit the driving force from the motor to the speed reduction portion; and
   the centrifugal impeller is operable to cool the speed reducer by rotating together with the first arm, generating wind, and causing generated wind to flow into the through-hole of the transmission shaft.

4. The robot according to claim 1, wherein the impeller is operable to rotate about a same axis as a rotation axis of the output of the speed reducer.

5. The robot according to claim 1, further comprising:
   a motor holder to hold the motor in an air passage of the impeller.

6. The robot according to claim 5, wherein the motor holder includes a convex cooling fin in the air passage.

7. The robot according to claim 1, further comprising:
   a first joint connecting the first arm to the base; and
   a second joint connecting the first arm to the second arm; wherein
   the motor is in an external space of the base attached to the speed reducer or an external space of the first arm attached to a second joint side of the second arm.

8. The robot according to claim 7, further comprising:
   a motor cover to cover the motor and including a motor-side filter portion to remove foreign matter from air while allowing the air to flow from the external space of the base to an internal space of the base.

9. The robot according to claim 8, wherein the motor and the motor cover are in direct contact with each other or in contact with each other via a thermal conductor.

10. The robot according to claim 1, wherein
    the impeller includes a plate-shaped movable blade that is tilted in a first rotation direction of the impeller when the impeller rotates in a second rotation direction of the impeller, and is tilted in the second rotation direction of the impeller when the impeller rotates in the first rotation direction of the impeller.

11. The robot according to claim 10, wherein the impeller further includes a stopper to maintain a tilted posture of the movable blade.

12. A robot comprising:
    a motor;
    a speed reducer including an input operable to rotate by a driving force of the motor, a speed reduction portion to slow down and transmit rotation from the input, and an output operable to rotate by a driving force from the speed reduction portion;
    a base;
    a first arm relatively rotatably attached to the base to rotate by an output from the output of the speed reducer;
    a second arm relatively rotatably attached to the first arm; and
    an impeller operable to rotate together with the first arm or the speed reducer; wherein
    the impeller is operable to rotate together with the first arm or the speed reducer and generate wind to cool the motor;
    the impeller is attached to the first arm;
    the first arm is attached to the output of the speed reducer; and
    the impeller and the speed reducer are connected to each other via the first arm in a heat conductive manner.

* * * * *